United States Patent
Tokashiki

(10) Patent No.: US 6,600,868 B2
(45) Date of Patent: Jul. 29, 2003

(54) INFORMATION PROCESSING SYSTEM, INFORMATION PROCESSING METHOD, AND RECORDING MEDIUM

(75) Inventor: Mamoru Tokashiki, Kanagawa (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 09/745,650

(22) Filed: Dec. 22, 2000

(65) Prior Publication Data

US 2001/0005843 A1 Jun. 28, 2001

(30) Foreign Application Priority Data

Dec. 24, 1999 (JP) .......................................... 11-366084

(51) Int. Cl.[7] ................................................ H04N 5/91
(52) U.S. Cl. ............................ 386/46; 386/95; 386/124
(58) Field of Search .................................. 386/125, 126, 386/46, 95, 124; H04N 5/91

(56) References Cited

U.S. PATENT DOCUMENTS

| | | | | |
|---|---|---|---|---|
| 5,546,118 A | * | 8/1996 | Ido | .............................. 725/115 |
| 5,751,883 A | * | 5/1998 | Ottesen et al. | ................. 386/27 |
| 6,020,982 A | * | 2/2000 | Yamauchi et al. | ........... 358/444 |
| 6,144,400 A | * | 11/2000 | Ebisawa | ....................... 725/101 |
| 6,208,804 B1 | * | 3/2001 | Ottesen et al. | ............... 386/125 |

FOREIGN PATENT DOCUMENTS

| | | | | |
|---|---|---|---|---|
| WO | WO 92/22983 | * | 12/1992 | ........... H04N/5/781 |

* cited by examiner

*Primary Examiner*—Vincent Boccio
*Assistant Examiner*—James A Fletcher
(74) *Attorney, Agent, or Firm*—Frommer Lawrence & Haug LLP; Gordon Kessler

(57) ABSTRACT

An information processing system is provided which is made to record data on a plurality of recording media such as video cassette tapes in the form of distribution. In the information processing system, on the basis of a command from a user, an application displays a user setting screen on an liquid crystal display. The user inputs the order, in which distribution recording is made on the video cassette tapes mounted on digital video cassette recorders, in any one of recording order input areas of a graphical user interface displayed on the liquid crystal display. The application informs the digital video cassette recorders of recording of contents in accordance with the priorities inputted by the user. The digital video cassette recorders controls a recording/reproduction processing section on the basis of the received priorities to start the recording of the contents.

13 Claims, 22 Drawing Sheets

FIG. 9

TAPE FOR DISTRIBUTED RECORDING IS NOT INSERTED INTO DVCR.
WHEN DVCR IS USED FOR DISTRIBUTED RECORDING, PLEASE INSERT TAPE WITHIN FIVE MINUTES. IF TAPE IS NOT INSERTED, DVCR IS NOT HANDLED AS DISTRIBUTED RECORDING DEVICE.

| TAPE ID | GUID AND RECORDING MANAGEMENT ID | | |
|---|---|---|---|
| | 1 | HEAD TIME CODE | LENGTH OF FREE BLOCK |
| INFORMATION ON BLANK OF TAPE | 2 | HEAD TIME CODE | LENGTH OF FREE BLOCK |
| NUMBER n OF FREE BLOCKS IN TAPE | ... | ... | ... |
| | n | HEAD TIME CODE | LENGTH OF FREE BLOCK |
| TOTAL FREE CAPACITY OF TAPE | | | |
| NUMBER k OF RECORDING BLOCKS IN TAPE | | | |
| TOTAL RECORDING CAPACITY OF TAPE | | | |
| INFORMATION ON CONTENTS RECORDED | CONTENT ID OF RECORDING BLOCK DISTRIBUTION-RECORDED | TAPE ID RECORDING PREVIOUS CONTENTS OF RECORDING BLOCK | |
| | | OVERLAP TIME WITH TAPE RECORDING NEXT CONTENTS | |
| | RECORDING BLOCK NO. ALLOCATED IN DISTRIBUTED RECORDING | TAPE ID RECORDING NEXT CONTENTS OF RECORDING BLOCK | |
| | DISTRIBUTED RECORDING FLAG | OVERLAP TIME WITH TAPE RECORDING NEXT CONTENTS | |

INFORMATION PROCESSING SYSTEM, INFORMATION PROCESSING METHOD, AND RECORDING MEDIUM

BACKGROUND OF THE INVENTION

1. Field of the Invention

The present invention relates to an information processing system, an information processing method and a recording medium, and more particularly to an information processing system, an information processing method and a recording medium, designed to, for example, efficiently and effectively accomplish distributed recording on a plurality of recording media.

2. Description of the Related Art

In a home network system such as the IEEE (The Institute of Electrical and Electronics Engineers) 1394 serial bus, a plurality of information processing units (for example, IRDs (Integrated Receiver Decoders) or DVCRs (Digital Video Cassette Recorders) are connected to each other for interchange of information among the information processing units, thereby performing reproduction (regeneration) or voice recording (picture recording). In the case of the IEEE1394 serial bus, a control side information processing unit issues an AV/C (Audio Video/Control) command to a controlled side information processing unit to implement control of the controlled side information processing unit.

As a middleware to conceal the AV/C command with respect to various types of application software, there has been known the HAVi (Hone Audio/Video Interoperability Architecture) (Trademark).

There is a problem which arises with the conventional HAVi, however, in that difficulty is encountered in recording one data on a plurality of recording media in the form of distribution or dispersion.

SUMMARY OF THE INVENTION

Accordingly, the present invention has been developed in consideration of such a situation, and it is an object of the invention to efficiently and effectively achieve distributed recording on a plurality of recording media in accordance with the free capacities of the recording media or the significance of recording data.

In accordance with an aspect of the invention, there is provided an information processing system comprising first detecting means for detecting identification information corresponding to each of recording media, second detecting means for detecting a free (blank) condition of each of the recording media, storage control means for implementing storage control to store information corresponding to the free conditions, detected by the second detecting means, in accordance with the identification information detected by the first detecting means, setting means for setting the order in which recording are to be made on the recording media, on the basis of the free conditions of the recording media, and recording control means for implementing recording control to record data on the recording media in accordance with the recording order set by the setting means.

In this case, the setting means can set the recording order in one of a first mode in which the setting is made by a user and a second mode in which the setting is made automatically.

In addition, it is also appropriate that display control means is provided which controls display of the recording order set by the setting means.

Still additionally, it is also appropriate that reproducing means is provided which continuously reproduces the data recorded on the one or more recording media in the form of distribution.

Moreover, it is also appropriate that designating means is provided which designates the significance of the record media.

Still moreover, it is also possible that the detecting means is made to detect the identification information through a network.

Furthermore, in accordance with another aspect of the present invention, there is provided an information processing method comprising a first detection step of detecting identification information corresponding to each of recording media, a second detecting step of detecting a free condition of each of the recording media, a storage control step of implementing storage control to store information corresponding to the free conditions, detected in the second detecting step, in accordance with the identification information detected in the first detecting step, a setting step of setting the order in which recording are to be made on the recording media, on the basis of the free conditions of the recording media, and a recording control step of implementing recording control to record data on the recording media in accordance with the recording order set in the setting step.

Still furthermore, in accordance with a further aspect of the present invention, there is provided a recording medium retaining a program comprising a first detection step of detecting identification information corresponding to each of recording media, a second detecting step of detecting a free condition of each of the recording media, a storage control step of implementing storage control to store information corresponding to the free conditions, detected in the second detecting step, in accordance with the identification information detected in the first detecting step, a setting step of setting the order in which recording are to be made on the recording media, on the basis of the free conditions of the recording media, and a recording control step of implementing recording control to record data on the recording media in accordance with the recording order set in the setting step.

In the foregoing information processing system, information processing method and recording medium program, the order of recording on the recording media is set on the basis of the free conditions of the recording media, and data is recorded on the recording media in accordance with the set recording order.

BRIEF DESCRIPTION OF THE DRAWINGS

Other objects and features of the present invention will become more readily apparent from the following detailed description of the preferred embodiments taken in conjunction with the accompanying drawings in which:

FIG. 9 is an illustration for explaining a GUT to be displayed on an LCD;

FIG. 11 is an illustration for explaining a GUI to be displayed on an LCD;

DESCRIPTION OF THE PREFERRED EMBODIMENTS

Figure 1:
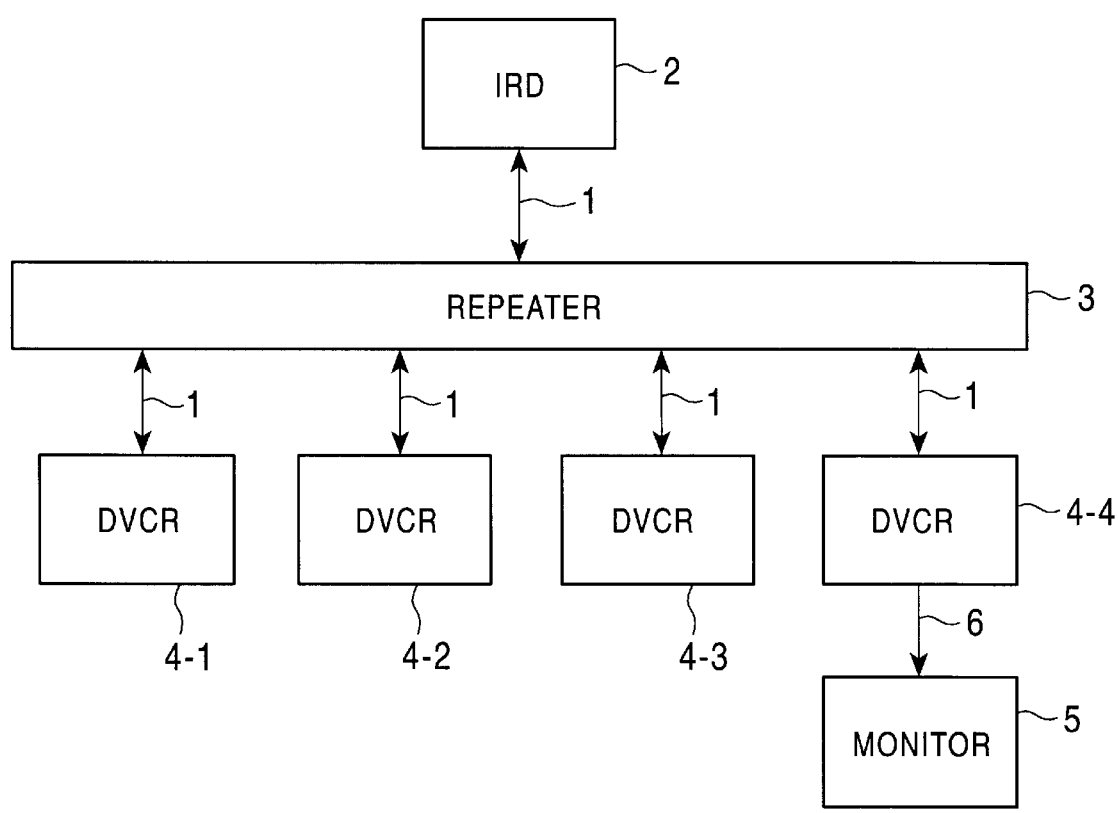
FIG. 1 is a block diagram showing a configuration of a network system to which the present invention is applicable.

FIG. 1 is a block diagram showing a configuration of a home network system. This system is made up of an IRD 2 and DVCRs 4-1 to 4-4. The IRD 2 and the DVCRs 4-1 to 4-4 (which will hereinafter be referred to simply as a "DVCR 4" in a case in which there is no need to discriminate each of the DVCRs 4-1 to 4-4 from the others) are connected through an IEEE1394 serial bus 1 to a repeater 3. In a state connected to the IEEE1394 serial bus 1, the DVCRs 4-1 to 4-4 transmit a DCM (Device Control Module) and an FCM (Functional Component Module), which will be described later, through the repeater 3 and the IEEE1394 serial bus 1 to the IRD 2. The IRD 2 detects, from the received information (DCM and FCM), a connection state of devices or units connected to the IEEE1394 serial bus 1 and displays a GUI (Graphical User Interface), which is for controlling these devices, on an LCD (Liquid Crystal Display) 29 (see FIG. 3) contained therein. In addition, the DVCR 4-4 is connected through an analog cord 6 to a monitor 5.

A user manipulates a touch panel 28 (see FIG. 3) pertaining to the IRD 2 through the use of a display on the LCD 29 to give an instruction for processing to be implemented by the DVCR 4 connected to the IEEE1394 serial bus 1. The IRD 2 generates a control signal on the basis of a command from the user and supplies the control signal through the IEEE1394 serial bus 1 and the repeater 3 to the DVCR 4.

The DVCR 4 conducts recording or reproducing processing of a picture or voice in accordance with the control signal inputted thereto.

Figure 2:
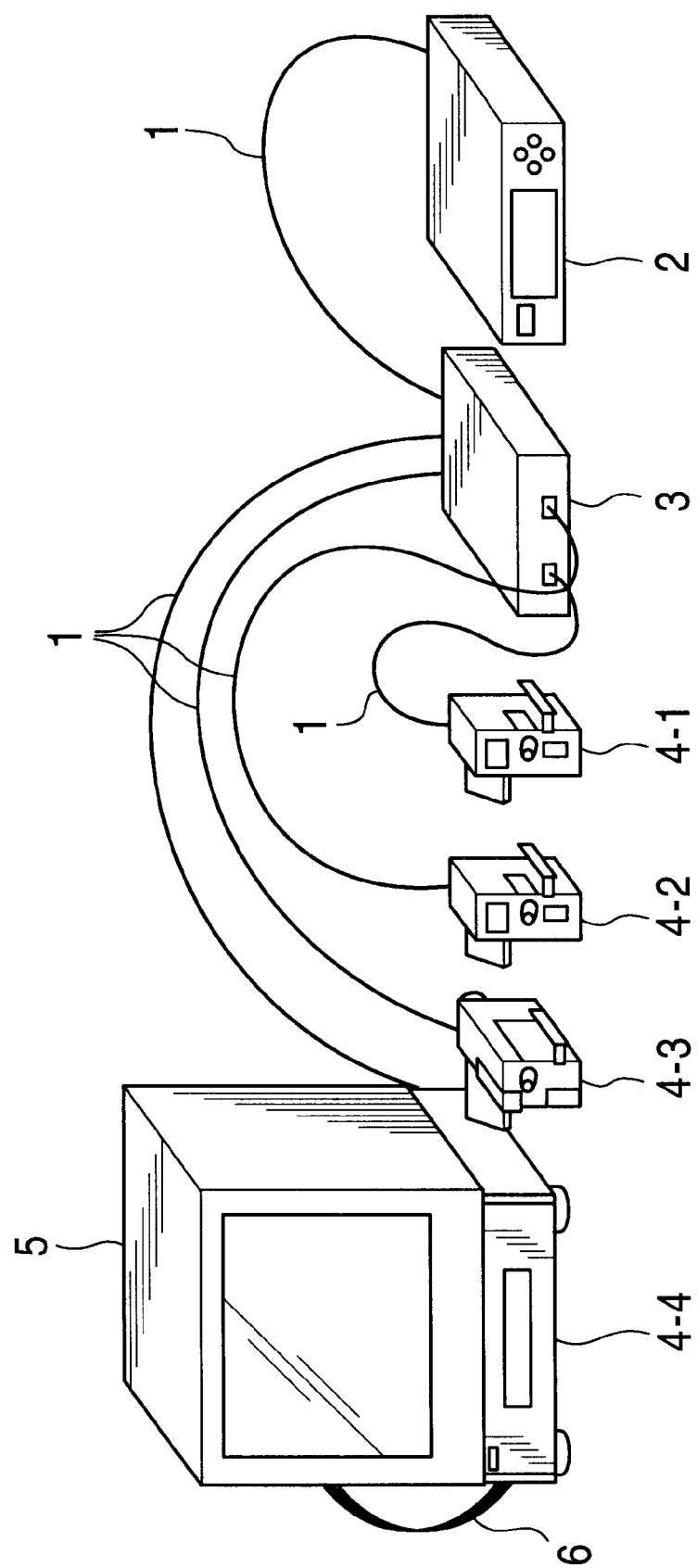
FIG. 2 is an illustration of connections in the network system shown in FIG. 1.

In such a home network system, the devices are connected to each other, for example, as shown in FIG. 2. As seen from this illustration, the repeater 3 corresponds to a hub in the so-called Ethernet (Trademark).

Figure 3:
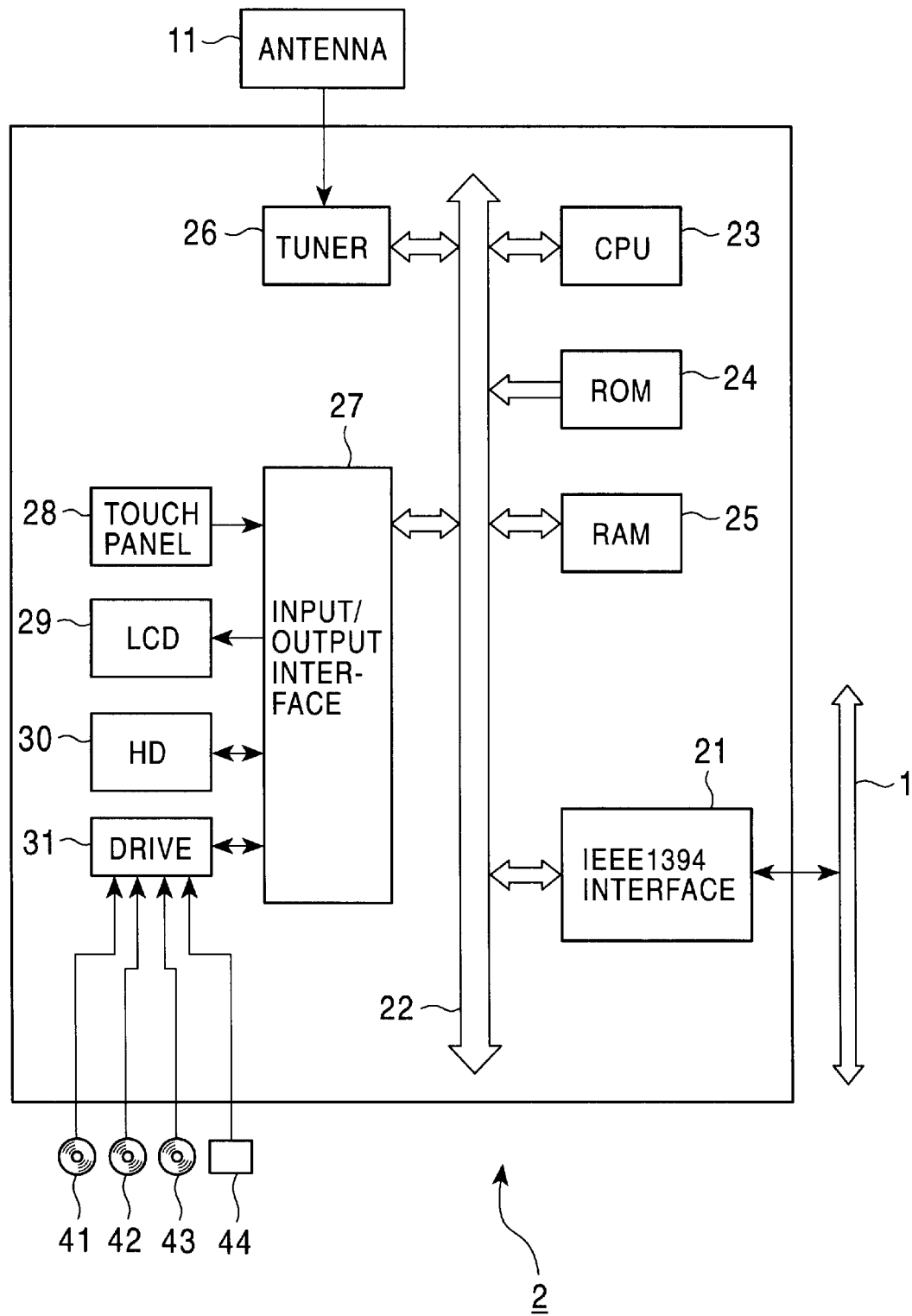
FIG. 3 is a block diagram showing an example of a configuration of an IRD shown in FIG. 1.

For example, the IRD 2 is configured as shown in FIG. 3. A signal fed from the DVCR 4 is inputted through the IEEE1394 serial bus 1, an IEEE1394 interface 21 and an internal bus 22 to a CPU (Central Processing Unit) 23. Furthermore, when a user manipulates a touch panel 28, a signal corresponding to that manipulation is inputted through an input/output interface 27 and the internal bus 22 to the CPU 23. The touch panel 28 can be manipulated in accordance with a message (GUI) displayed on the LCD 29. Incidentally, it is also appropriate that the IRD 2 is designed to be remotely manipulated through not only the touch panel 28 but also a remote controller (not shown).

The CPU 23 reads out and implements a program retained in a ROM 24 or a hard disk 30 in accordance with a signal inputted thereto, and, when needed, outputs the processing result through the input/output interface 27 to the LCD 29 for display. In addition, for example, the CPU 23 generates a character image data representative of a message for assisting the manipulation by the user to output the character image data through the internal bus 22 and the input/output interface 27 to the LCD 29 for display, or generates a control signal for control of the DVCR 4 to transmit the control signal through the internal bus 22, the IEEE1394 interface 21 and the IEEE1394 serial bus 1 to the DVCR 4. A Ram 25 temporarily retains a program to be executed in the CPU 23, data produced through the implementation of that program, and data needed for the DVCR 4 to implement processing.

An antenna 11 is for supplying a tuner 26 of the IRD 2 with satellite broadcasting signals received. The tuner 26 accepts, of the satellite broadcasting signals received by the antenna 11, a broadcasting channel signal designated by the CPU 23. The hard disk (HD) 30 retains various kinds of applications, middlewares and others the CPU 23 implements. In addition, the hard disk 30 preserves an internal list of information concerning a video cassette tape (a concrete example thereof will be described later). To a drive 31, there are mountable a magnetic disk 41, an optical disk 42, a magneto optical disk 43, a semiconductor memory 44 or the like.

Figure 4:
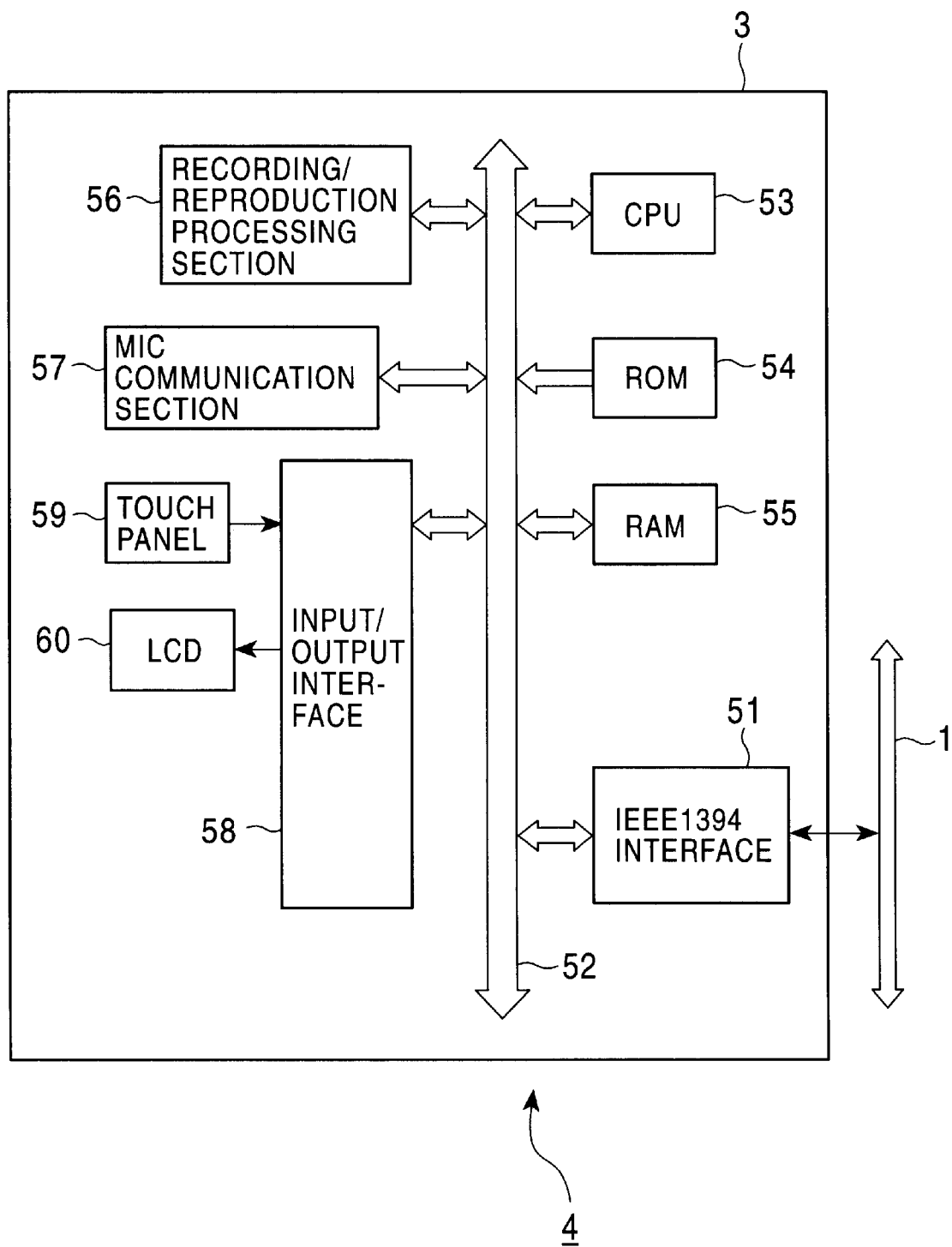
FIG. 4 is a block diagram showing an example of a configuration of a DVCR shown in FIG. 1.

FIG. 4 is a block diagram showing an internal configuration of the DVCR 4. A signal transmitted from the IRD 2 is inputted through an IEEE1394 serial bus 1, an IEEE1394 interface 51 and an internal bus 52 to a CPU 53. In addition, when a user manipulates a touch panel 59, a signal corresponding to the manipulation by the user is inputted through an input/output interface 58 and the internal bus 52 to the CPU 53.

The CPU 53 reads out and implements, on the basis of the inputted signal, a program preserved in a ROM 54, and for example, outputs a control signal through the internal bus 52 to a recording/reproduction processing section 56 while transmitting its own DCM and FCM, retained in the ROM 54, through the internal bus 52, the IEEE1394 interface 51 and the IEEE1394 serial bus 1 to the IRD 2. The RAM 55 is for temporarily storing a program to be implemented by the CPU 53, data generated by the implementation of that program, data needed for the implementation of processing by the DVCR 4, and others.

The recording/reproduction processing section 56, in accordance with a control signal inputted from the CPU 53, reads out data recorded in media (in this case, video cassette tapes; not shown) mounted therein, and transmits the read data through the internal bus 52, the IEEE1394 interface 51 and the IEEE1394 serial bus 1 to the IRD 2 or outputs the read data through the internal bus 52 and the input/output interface 58 to an LCD 60 for display. In addition, the recording/reproduction processing section 56 records, on a video cassette tape (not shown) mounted, data transmitted from the IRD 2 through the IEEE1394 serial bus 1, the IEEE1394 interface 51 and the internal bus 52.

An MIC (Memory In Cassette) communication section 57 makes a communication with an MIC composed of, for example, a semiconductor memory, a memory stick (Trademark) or the like, mounted on a video cassette tape inserted into the DVCR 4, to detect information recorded therein. The MIC retains an ID (Identification number) peculiar to that video cassette tape. The CPU 53 can read out the ID recorded in the MIC through the internal bus 52 to detect the video cassette tape after replacement. In addition, The IRD 2 reads the ID existing in the MIC through the internal bus 52, the IEEE1394 interface 51 and the IEEE1394 serial bus 1, thereby confirming the video cassette tape inserted into the DVCR 4.

The linked operations of the devices on a network shown in FIG. 1 require a middleware (OS, network control program, or a software located between a low-order software such as a database system and a high-order application software for offering various services to the application software) for network control and management. In addition, even if a device manufactured by a different maker is connected to the network, for the network to operates normally to accomplish interoperations of the devices, a common specification the middle ware should conforms to is essential. As a middleware for the network control and management, a description will be given here of a network system to which the HAVi (Trademark) is applied.

Figure 5:
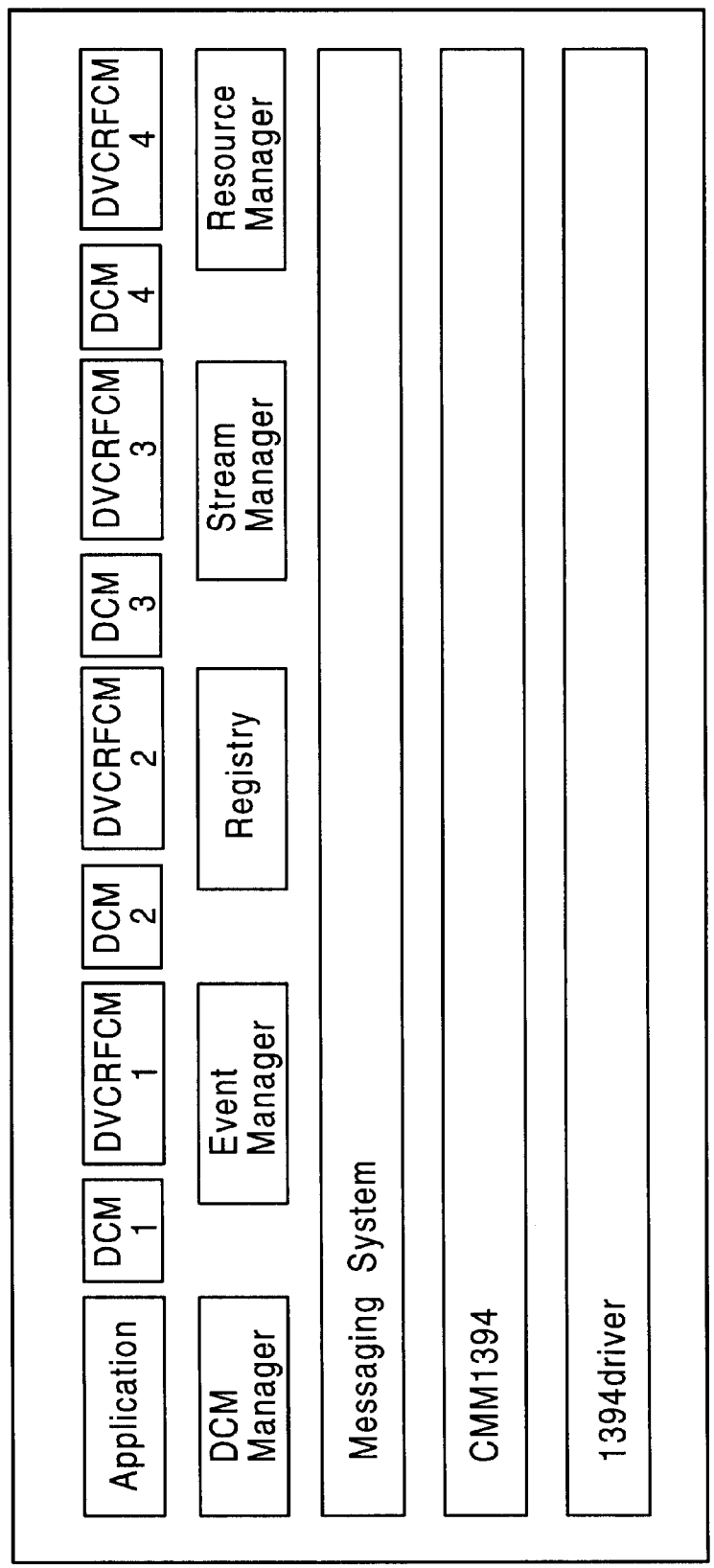
FIG. 5 is an illustration useful for explaining a software stack retained in a hard disk shown in FIG. 3.

FIG. 5 is an illustration of a software stack preserved in the hard disk 30 of the IRD 2 in FIG. 3. In the illustration, the upper side modules constitutes a higher-order hierarchy as compared with the lower side modules. The portion except a 1394driver and an application forms a software module corresponding to the HAVi.

The 1394driver is a module which describes a portion dependent on the IEEE1394 serial bus 1, and is a software for presenting a common procedure for the device access to the high-order software. A CMM (Communication Media Manager) 1394 acts as an interface between the IEEE1394 serial bus 1 and each software module/application of the HAVi. The CMM1394 presents a transmission feature for transmission and reception of signals between the devices connected to the IEEE1394 serial bus 1, and understands the operating status of the IEEE1394 serial bus 1 and supplies that information to other software modules.

A messaging system acts as an API (Application Programming Interface) for establishing communications between software modules of the devices on the network, and has a function to interchange messages between the software modules. Thus, in a network employing the HAVi, a message can be transmitted even if the message transmitting side and the message receiving side do not understand the other party places on the network.

A DCM manager is for installing a DCM and a DVCRFCM, which will be described later, with respect to each device on the network. In the network employing the HAVi, when a new device is connected to the network, the DCM manager installs the DCM and DVCRFCM corresponding to the newly connected device, and when a device is disconnected from the network, uninstalls the DCM and DVCRFCM corresponding to the disconnected device.

An event manager, in a case in which the network state varies, for example, because a new device is connected to the network or because a device is disconnected therefrom, generates an event to transfer it to other software modules. Thus, in the network employing the HAVi, the plug-and-play is realizable.

A registry is for retaining or updating information on devices, that is, information on the device connected to the network and the function of that device, and enables the interaction between different devices. An application program obtains necessary information from this registry. In addition, each device on the network can refer to the registry to confirm the locations of basic software modules of the other devices on the network.

A stream manager is for monitoring and managing a flow of stream data (continuous data) such as pictures and voices on the network to enable the real-time transmission of the stream data. In addition, the stream manager manages the connections in the interior of a device or among devices for securing or releasing the network resources, and further for offering the connection information on the entire network. Still additionally, the stream manager can support the reconnection after the bus reset of the network.

A resource manager manages the network, such as dealing with problems on collision of the right of device using, managing a scheduled event, for example, the processing reserved for a connected device, and checking the disconnection of a device after registration.

Although various kinds of applications are incorporated according to purposes, the application used in this case is for storing, in an internal list, ID (identification information) preserved in the MIC mounted on a video cassette tape and information on contents recorded in the video cassette tape (the details of the internal list will be described later). In addition, this application sets the order of priority in recording data on data-recordable video cassette tapes for conducting the recording processing on the video cassette tapes according to the order, and conducts continuous reproduction processing of data recorded (distribution-recorded) in a plurality of video cassette tapes in the form of distribution or dispersion.

DCM 1 to DCM 4 are for controlling devices, and are installed through the DVCRs 4-1 to 4-4, respectively. An application program executes the control of each device through the corresponding DCM in the IRD 2 without directly controlling each device connected to the network. DVCRFCM 1 to DVCRFCM 4 are installed through the DVCRs 4-1 to 4-4, respectively, and indicate the contents (functions) of the control the application program can implement with respect to each device, and further send an AV/C command to the devices designated through the DCM 1 to DCM 4.

Since the DCM and the DVCRFCM function as an API, the application itself is not required to consider the difference between the devices. Accordingly, in the network employing the HAVi, a device on the network can recognize the functions of the other devices, and can operate the other devices from a remote place.

Although a description will be omitted, each module of the software stack described with reference to FIG. 5 is read out from the hard disk 30 to the RAM 25 and implemented by the CPU 23.

The foregoing software modules are held in the devices connected to the network according to the classes of the devices prescribed in the HAVi. The HAVi prescribes the following four kinds of device classes.

An FAV (Full AV Device) corresponding to the device which has a function to manage the network, and is equipped with all the software modules of HAVi mentioned above (although it sometimes does not have DCM and AVDISCFCM, they can be installed through a BAV which will be described later). The FAV can implement an application using the Java (Trademark) employed as an HAVi byte code. Thus, the FAV can hold the DCMs and FCMs of the other devices, and because of the possession of the DCMs and FCMs of the other devices, it can place the other devices under its control.

An IAV (Intermediate AV Device) corresponds to a device having a function to manage the network like the FAV, but unlike the FAV, it is under an environment in which it is impossible to implement an application using the Java employed as the HAVi byte code, and hence the DCMs and FCMs of the other devices are incorporated thereinto in advance.

A BAV (Base AV Device) is equivalent to a controlled device connectable directly to the HAVi network, and has its own DCM and FCM. An LAV (Legacy AV Device) functions as only a device connectable with the IEEE1394 serial bus 1, but, since it corresponds to an AV/C command, it can not only operate singly but also operate as a controlled device.

The description of the present invention will be given as the IRD 2 acts as an IAV or an FAV (the IEEE1394 interface 21 is equivalent to the 1394driver and the CMM1394) and the DVCR 4 serves as a device corresponding to an LAV.

Figure 6:
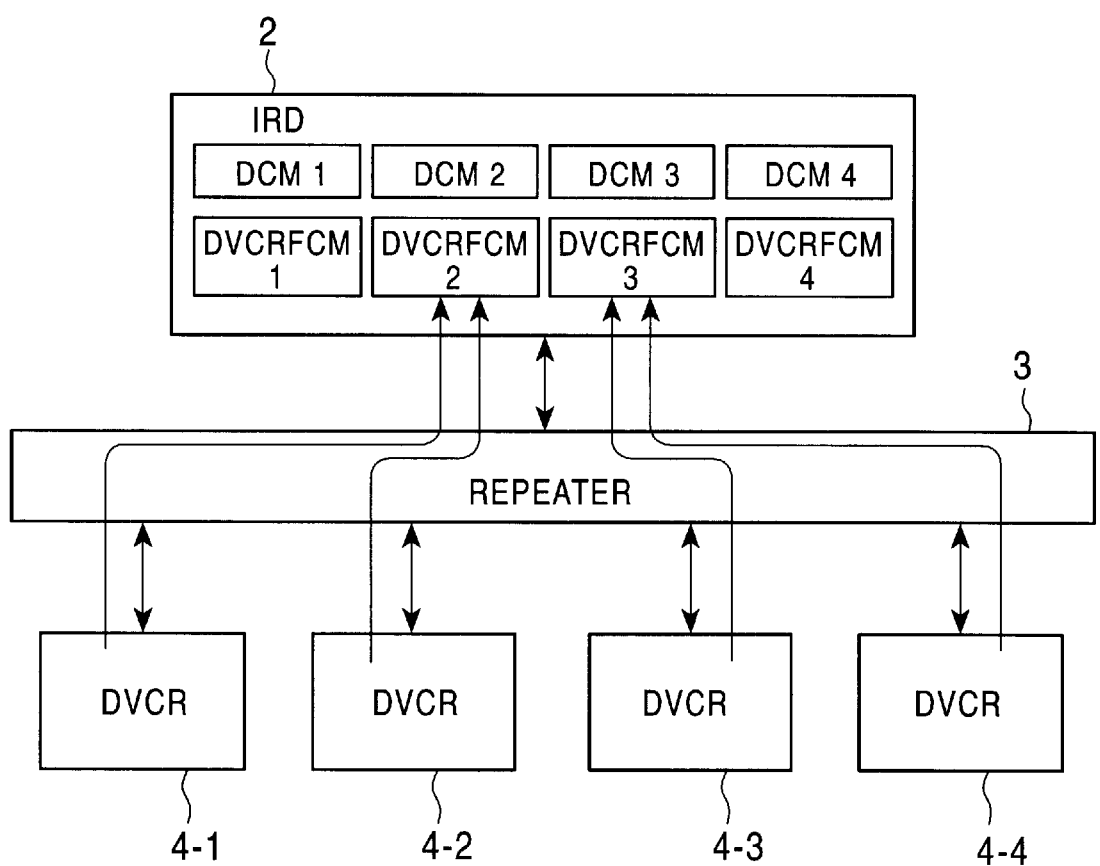
FIG. 6 is an illustration useful for explaining install of a DCM and an FCM.

Incidentally, when the IRD 2 is the FAV, as shown in FIG. 6, the IRD 2 can place the DVCRs 4-1 to 4-4 under its control by the installing of DVCRFCM 1 to DVCRFCM 4 and DCM 1 to DCM 4 of the DVCRs 4-1 to 4-4 forming the LAVs.

Figure 7:
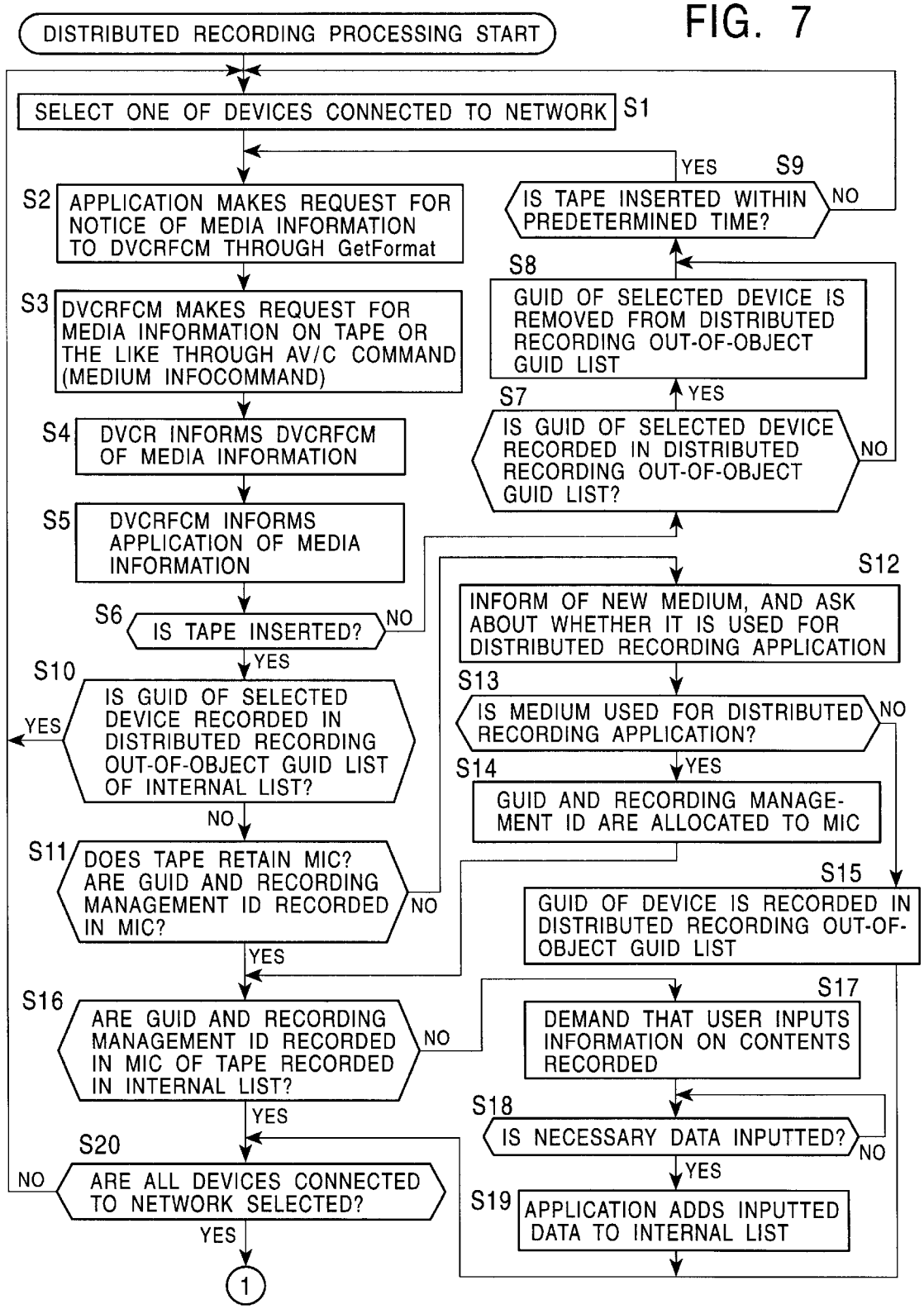
FIG. 7 is a flow chart useful for explaining distributed recording processing.
Figure 8:
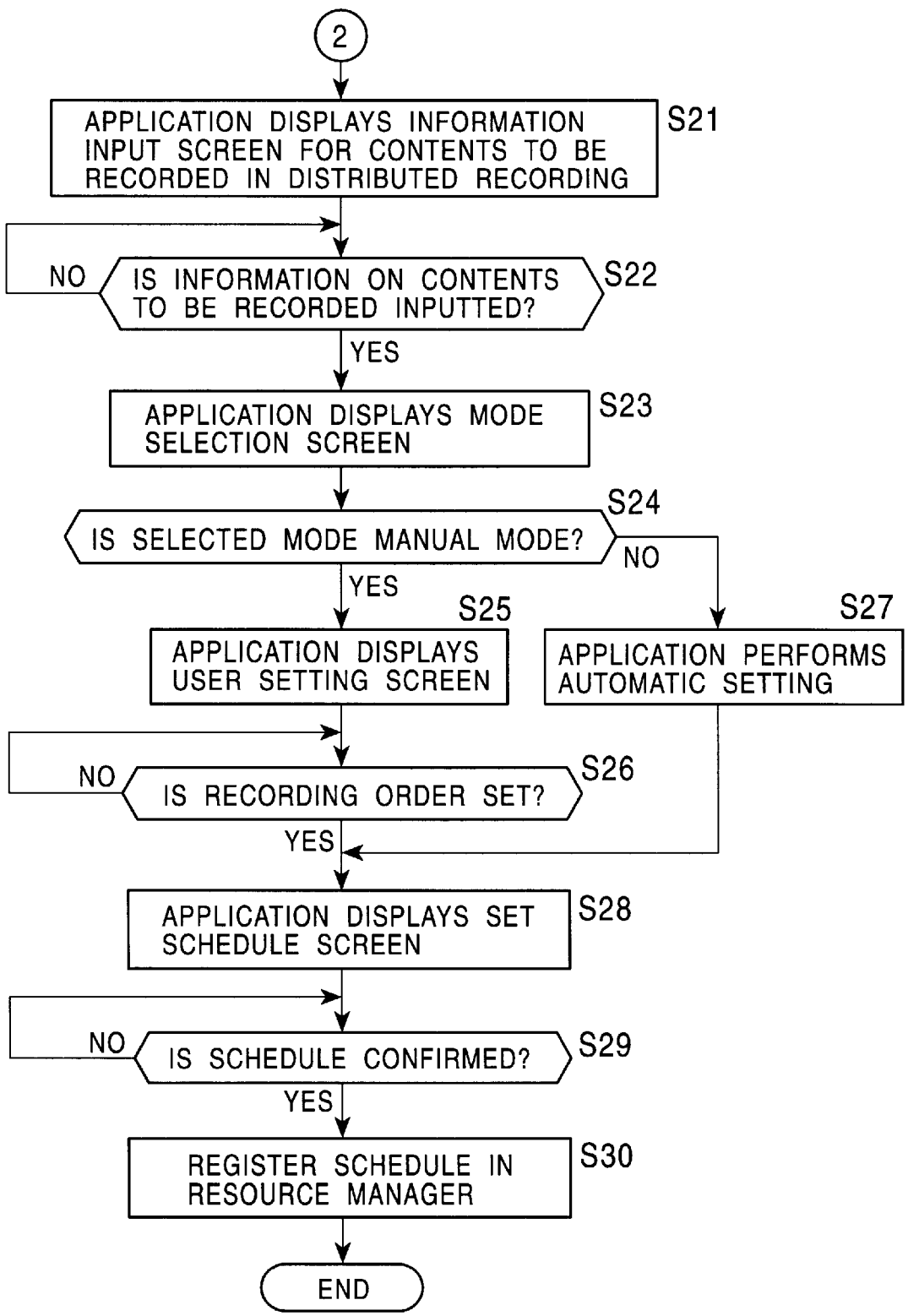
FIG. 8 is a flow chart subsequent to the flow chart of FIG. 7.

Secondly, referring to the flow charts of FIGS. 7 and 8, a description will be given hereinbelow of distributed recording processing to be implemented by the IRD 2 on the assumption of continuous distributed recording reservation. Incidentally, this processing starts in response to a distributed recording command inputted when a user wants to record contents in the form of distribution (dispersion) or record pictures on reservation.

In a step S1, the application selects one from the installed DVCRFCM 1 to DVCRFCM 4. Let it be assumed that the DVCRFCM 1 is selected. In a step S2, the application outputs a command GetFormat which makes a request for notice of media information with respect to the selected DVCRFCM. In a step S3, the DVCRFCM 1 outputs an AV/C command (MEDIUM INFOcommand) for notice of that media information to the DVCR 4 (in this case, DVCR 4-1).

Furthermore, in a step S4, the DVCR 4-1 (CPU 53) informs the DVCRFCM 1 of its own media information when receiving that notice from the DVCRFCM 1. In a step S5, the DVCRFCM 1 informs the application of the media information when receiving a response (media information) from the DVCR 4-1.

In a step S6, the application makes a decision, on the basis of the obtained media information, as to whether or not a video cassette tape has been inserted into the DVCR 4-1, that is, whether or not a category value of a response to the command GetFormat outputted to the DVCRFCM 1 is 0xff. If the decision shows no insertion of the video cassette tape (if the answer indicates that the category value is 0xff), the operational flow goes to a step S7 where the application makes a decision as to whether or not a GUID (Global Unique Identifier) of the selected device (in this case, the DVCRFCM 1) is recorded in a GUID list indicating other than distributed recording object (which will be referred to hereinafter as a "distributed recording out-of-object list") forming an internal list. If the GUID of the DVCRFCM 1 exists in the distributed recording out-of-object list, the operational flow advances to a step S8 where the application removes the GUID of the DVCRFCM 1 recorded in the distributed recording out-of-object GUID list. Thereafter, the operational flow advances to a step S9.

On the other hand, if the answer of the step S7 shows that the GUID of the DVCRFCM 1 does not exist in the distributed recording out-of-object GUID list, the operational flow skips the step S8 and advances to the step S9. In the step S9, the application displays, on the LCD 29, a message informing the user of the fact of no insertion of a video cassette tape. Thus, for example, as shown in FIG. 9, there is displayed a GUI (GUI of a message of "A tape for distributed recording is not inserted into the DVCR." "When the DVCR is used for distributed recording, a tape is inserted therein within five minutes." "If the tape is not inserted, the DVCR is not handled as a distributed recording device.").

Furthermore, in the step S9, the application makes a decision as to whether or not a tape is inserted within a predetermined period of time (in this case, within five minutes). If the decision shows the insertion of the tape, that is, a detection on the tape insertion is made, the operational flow returns to the step S2 to repeat the above-mentioned subsequent processing. If the tape is not inserted within the predetermined period of time, that is, in the case of the detection of time-out, the operational flow returns to the step S1 to repeat the above-mentioned subsequent processing.

Incidentally, in the above-described example, although the time-out detection has been made in the case in which the tape is not inserted within five minutes, this time can be set arbitrarily.

In a case in which the decision of the step S6 shows the insertion of the video cassette tape, that is, shows that the category of the response to the command GetFormat outputted to the DVCRFCM 1 is not 0xff, the operational flow proceeds to a step S10 where the application makes a decision as to whether or not the GUID of the selected device (in this case, DVCRFCM 1) is recorded in the distributed recording out-of-object GUID list forming the internal list. If the GUID of the selected device is recorded in the distributed recording out-of-object GUID list, the operational flow returns to the step S1 to repeat the above-mentioned subsequent processing.

On the other hand, if the answer of the step S10 indicates that the GUID of the selected device is not recorded in the distributed recording out-of-object GUID list, the operational flow proceeds to a step S11 where the application makes a decision on whether or not that video cassette tape has an MIC and the GUID of the DVCR 4-1 and a recording management ID (identification information) comprising a numerical value of several bytes are recorded in this MIC.

That is, in this example, in a case in which a video cassette tape is used for a distributed recording application, the recording management ID comprising several-byte numerical value is allocated to the mounted MIC. Accordingly, whether or not that tape is a non-recorded tape is determined by making a decision on whether or not the GUID peculiar to the device and the recording management ID comprising the several-byte numerical value are assigned to the MIC.

If the decision of the step S11 is negative, that is, if the GUID and the recording management ID are not recorded in the MIC, the operational flow proceeds to a step S12 where the application informs the user that the video cassette tape is a new medium, and displays, on the LCD 29, a message indicating whether or not the video cassette tape is used with the distributed recording application. Thus, for example, as shown in FIG. 10, there is displayed a GUI (GUI for a message "A new medium (writable) is in an inserted condition." "Do you use this tape for distributed recording?").

Figure 10:
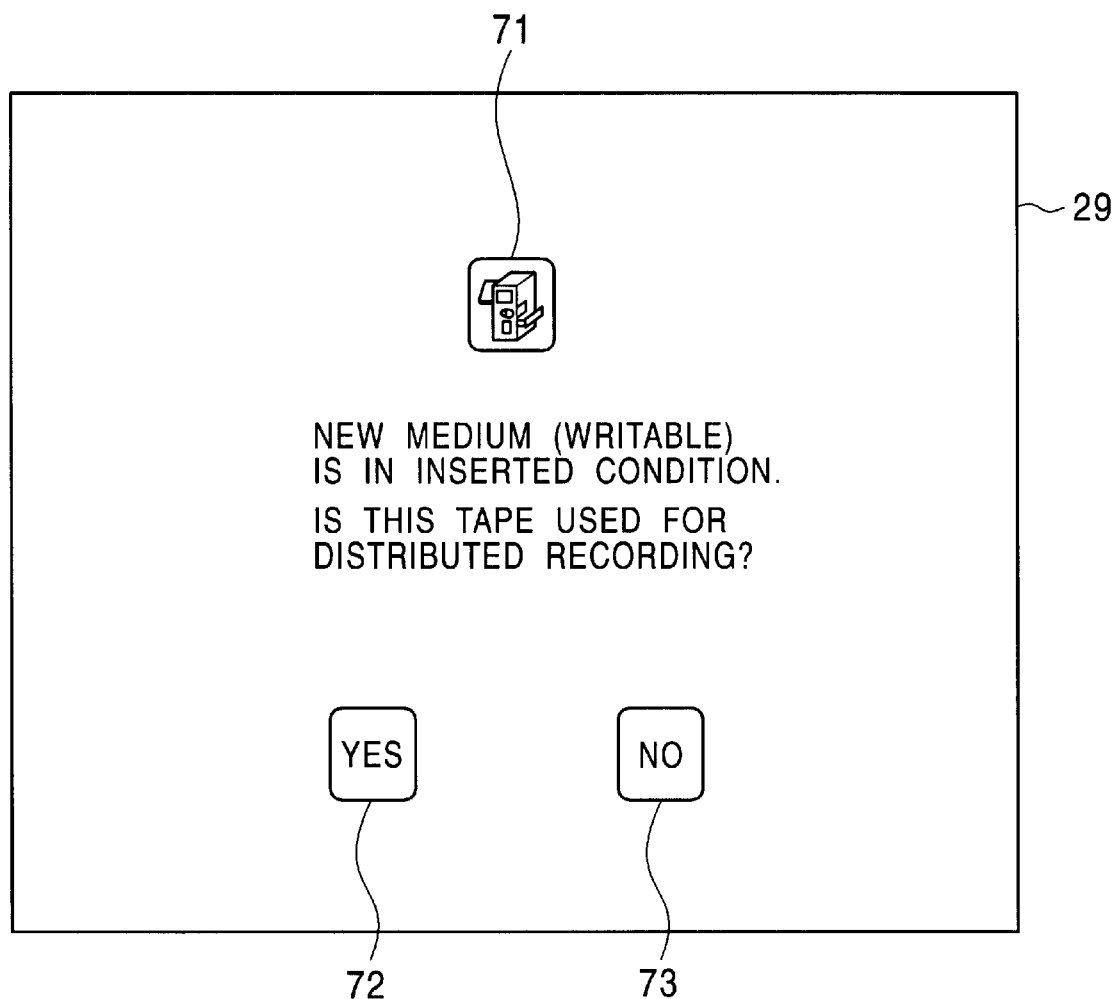
FIG. 10 is an illustration for explaining an internal list.

In the GUI of FIG. 10, an icon 71 displayed indicates the external shape of the device (DVCR 4) related to the message. In addition, the user manipulates the touch panel 28 in accordance with the message displayed and selects (presses) one of an YES button 72 and a NO button 73 on the basis of whether the distributed recording is conducted or not.

After the display of the GUI of FIG. 10 on the LCD 29, in a step S13, the application decides whether or not that tape is used for the distributed recording application, that is, whether or not the touch panel 28 is manipulated by the user to press the YES button 72. If the decision indicates that the tape is used for the distributed recording application, the operational flow proceeds a step S14 where the GUID of the DVCR 4-1 and the recording management ID comprising several-byte numerical value are allocated to the MIC placed on that video cassette tape. At this time, the application increments the value of the recording management ID comprising the several-byte numerical by one whenever the distributed recording processing is updated, thus enabling the discrimination of the video cassette tape mounted on the same device.

On the other hand, if the answer of the step S13 indicates that the tape is not used for the distributed recording application, that is, when the user manipulates the touch panel 18 to press the NO button 73, the operational flow advances to a step S15 where the application handles that video cassette tape as the out-of-object on distributed recording and records the GUID of that device (in this case, DVCR 4-1) in the distributed recording out-of-object GUID list without conducting the acquisition processing of tape information. Thereafter, the operational flow skips the processing in steps S16 to S19 and proceeds to a step S20.

If the decision of the step S11 shows that the GUID and the recording management ID are recorded in the MIC, or after the processing in the step S14, the operational flow goes to a step S16 where the application decides whether or not the GUID and recording management ID recorded in the MIC are recorded in an internal list of the hard disk 30.

For example, as shown in FIG. 11, the internal list comprises three elements of a tape ID (GUID and recording management ID), information on blank of the tape, and information on the contents recorded. In the information on blank of the tape, the number n of free blocks of the tape and total free capacity of the tape are recorded, and the head time codes of the free blocks and the lengths of that free blocks are recorded in connection with only the number n of free blocks.

In addition, in connection with the information on the contents recorded, there are recorded the number k of recording blocks in a tape, a total recording capacity of a tape and a distributed recording flag representative of whether the contents distribution-recorded are included or not. Still additionally, in the case of being distribution-recorded, there are recorded a contents ID of a recording block distribution-recorded, a recording block number allocated at the distribution recording, a tape ID recording a previous contents of a recording block, an overlap time with a tape recording the previous contents, a tape ID recording the next contents of a recording block, and an overlap time with a tape recording the next contents.

The previous-contents recording tape ID and the overlap time are recorded in order to deal with a rewind of the tape, while the next-contents recording tape ID and the overlap time are recorded in order to deal with the reproduction (playback) or fast-forward of the tape. That is, in the case of the tape rewind, the switching of video cassette tapes can be made successively on the basis of the previous-content recording tape ID and the overlap time. On the other hand, in the case of the tape reproduction or fast-forward, the switching of video cassette tapes can be made in succession on the basis of the next-content recording tape ID and the overlap time.

Incidentally, in the case of the contents non-recorded tape, only the tape ID, the number n (=1) of free blocks in a tape and the total free capacity (recordable capacity) of a tape are recorded, invalid values are recorded for other than these.

Referring again to FIG. 7, if the decision of the step S16 shows that the GUID and the recording management ID recorded in the MIC are not recorded in the internal list, the operational flow advances to a step S17 where the application makes a recording/reproduction processing section 56 of the DVCR 4 reproduce the video cassette tape, and makes the LCD 29 display the acquired tape information, and further induces that user inputs information on the contents recorded. Thus, for example, a GUI is displayed as shown in FIG. 12.

Figure 12:
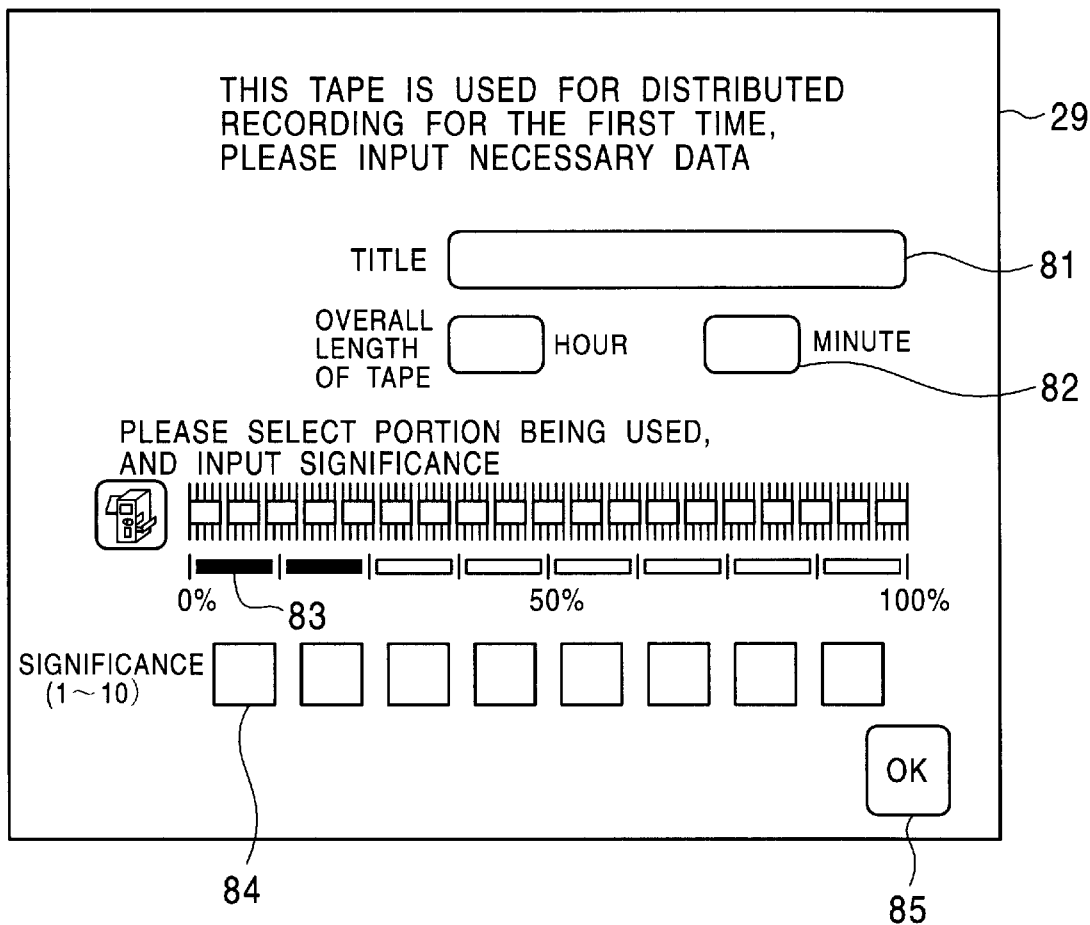
FIG. 12 is an illustration for explaining a GUT to be displayed on an LCD in response to a touch of an YES button in FIG. 11.

In the GUI of FIG. 12, through the use of a keyboard or the like displayed on the touch panel 28, the user can input the title of a video cassette tape in a tape title input area 81 and input the overall length (recordable time) of a video cassette tape in a tape overall length input area 82. Thus, the tape title name (title) inputted in the tape title input area 81 and the tape ID are associated with each other in a correspondence table.

Furthermore, in a case in which there is data already recorded, a selection area 83 is reversed for easy viewing of the recorded area. In addition, the user selects (touches) the selection area 83 of a region in which data is recorded, and inputs any one of numerals 1 to 10 in a significance input area 84, thereby setting the significance of the recorded data.

In this case, the significance shows a higher priority as its value increases, while signifying a lower priority as its value decreases. This value can be set arbitrarily. Accordingly, the application can substitute (overwrite) one after another for lower significance set by the user when there is not enough of free area for recording.

Returning to FIG. 7, if the answer of the step S17 indicates that nothing is reproduced from the video cassette tape, since that tape signifies a non-recorded tape, the application makes the recording/reproduction processing section 56 of the DVCR 4 conduct the format processing and then makes the LCD 29 display the GUI shown in FIG. 12, and further induces that the user inputs information on the contents.

In a step S18, the application makes a decision as to whether or not the user manipulates the touch panel 28 to input necessary data in the GUI shown in FIG. 12. If a decision is made that it is not yet inputted, the application waits for the input of the necessary data by the user. Thereafter, when the user inputs the necessary data and touches an OK button 85, the operational flow advances to a step S19 where the application adds the information on a video cassette tape inputted by the user to an internal list of the hard disk 30.

On the other hand, the decision of the step S16 shows that the GUID and the recording management ID recorded in the MIC are already recorded in the internal list of the hard disk 30, after the processing in the step S15 or S20, in a step S20, the application makes a decision as to whether all the devices connected to the network are selected or not. If they are not yet selected, the operational flow returns to the step S1 to repeatedly conduct the above-described processing and the subsequent processing.

On the other hand, if the decision of the step S20 shows the selection of all the devices connected to the network, the operational flow proceeds to a step S21 where the application displays, on the LCD 29, an input screen for inputting information on the contents to be recorded in the form of distribution. Thus, for example, a GUI is displayed as shown in FIG. 13.

Figure 13:
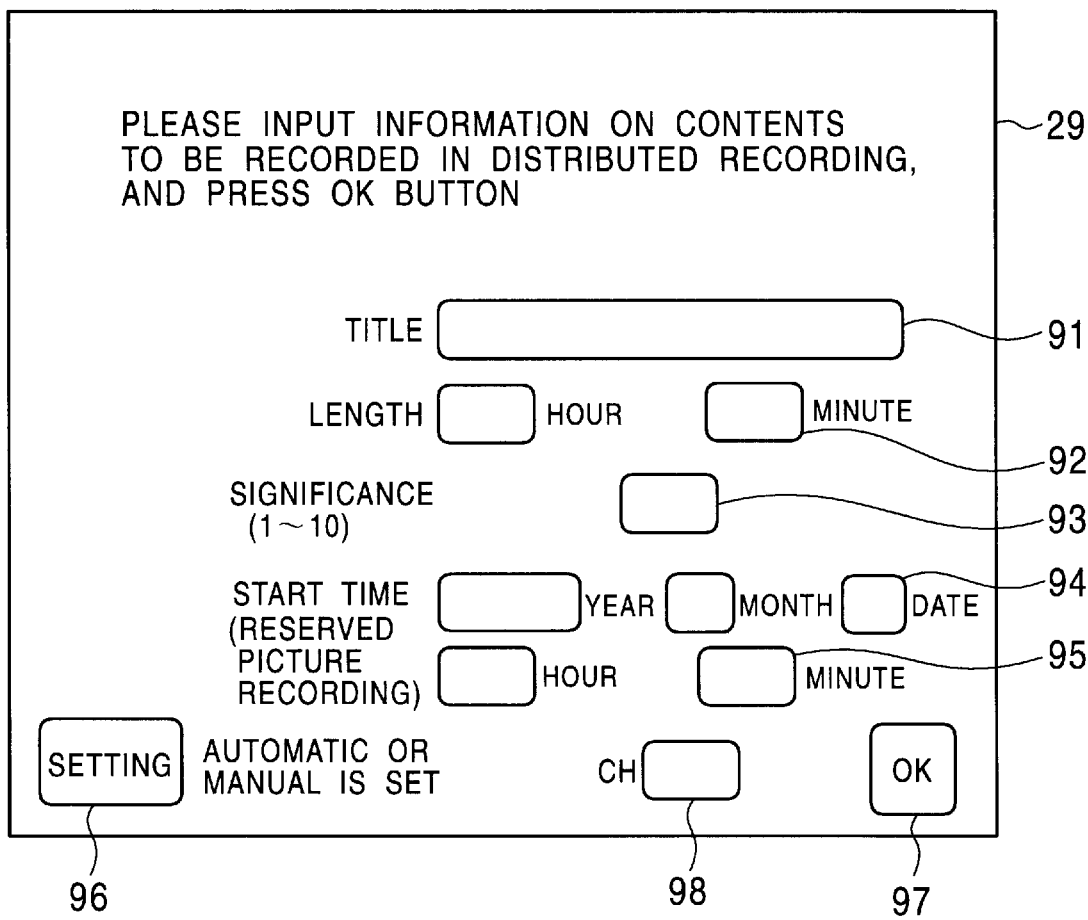
FIG. 13 is an illustration for explaining a GUI to be displayed on an LCD.

In the GUI of FIG. 13, through the use of a keyboard or the like displayed on the touch panel 28, a user can input the title of the contents to be recording in the form of distribution in a contents title input area 91, input the length (time) of the contents to be distribution-recorded in a length input area 92, input the significance of the contents in a significance input area 93, and input a contents channel number in a channel number input area 98. In addition, in the case of the reserved picture recording, the user can input the start date and start time in a start data input area 94 and a start time input area 95, respectively, thereby starting the recording of contents at a time reserved. Still additionally, this input manipulation can make the mapping between the contents title and the contents ID in a correspondence table.

Returning to FIG. 8, in a step S22, the application makes a decision on whether or not the user manipulates the touch panel 28 to input the information on the contents to be recorded. If a decision is made that the user does not yet input the information on the contents to be recorded, a step S22 follows to wait until the user inputs the contents information. Following this, when the user has inputted the contents information and has touched an OK button 97, the contents to be recorded are determined. In addition, when the user has touched a setting button 96 for setting the recording mode, the operational flow proceeds to a step S23 where the application makes the LCD 29 display a mode selection screen. Thus, for example, a GUI is displayed as shown in FIG. 14.

Figure 14:
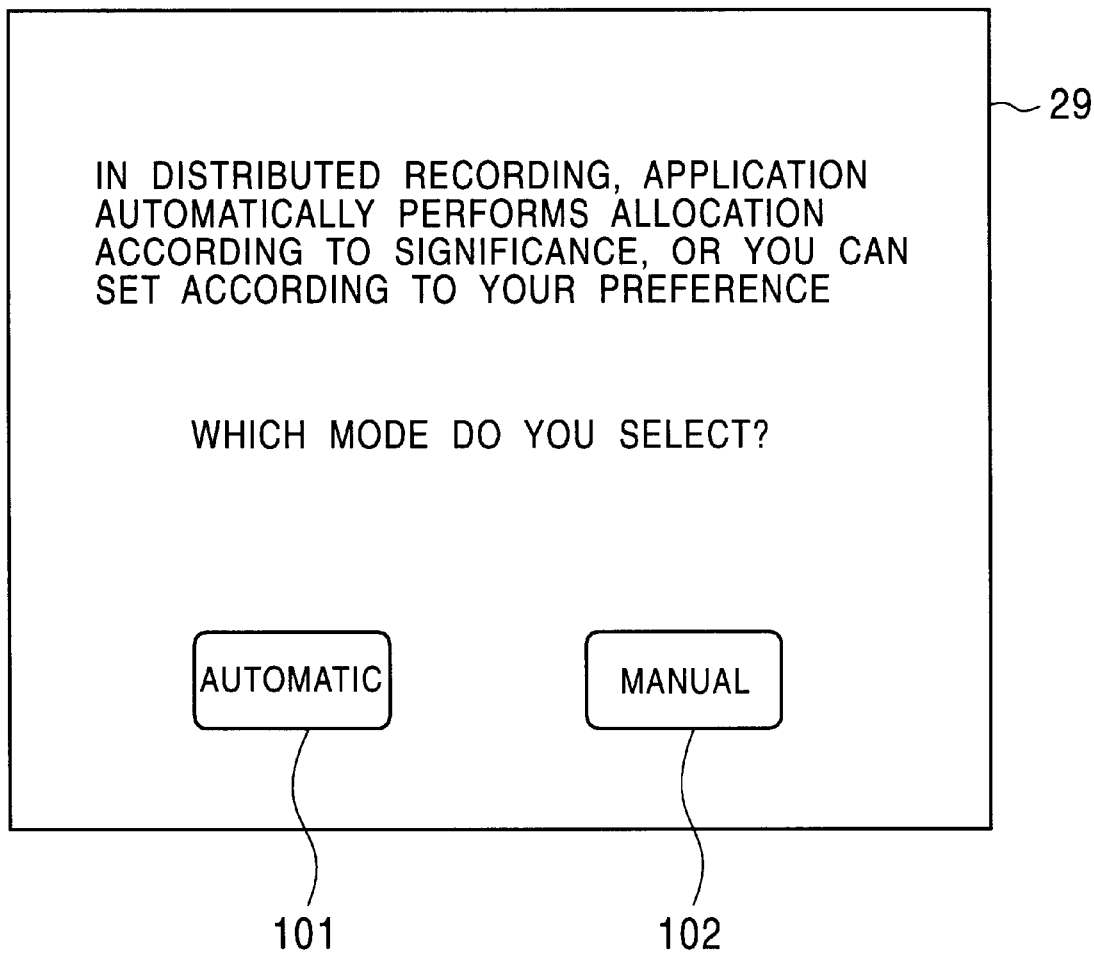
FIG. 14 is an illustration for explaining a GUI to be displayed on an LCD in response to a touch of a setting button in FIG. 13.

In the GUI of FIG. 14, when the distributed recording is made in an automatic setting mode, the user selects (touches) an "automatic" button 101. On the other hand, if the distributed recording is made in a manual mode set by the user himself/herself, the user selects a "manual" button 102.

In a step S24, the application makes a decision on whether or not the mode set by the user is the manual mode, that is, whether or not the user manipulates the touch panel 28 to touch the "manual" button 102. If the decision shows the manual mode, the operational flow enters into a step S25 where the application makes the LCD 29 display the user setting screen. Thus, for example, a GUI is displayed as shown in FIG. 15.

Figure 15:
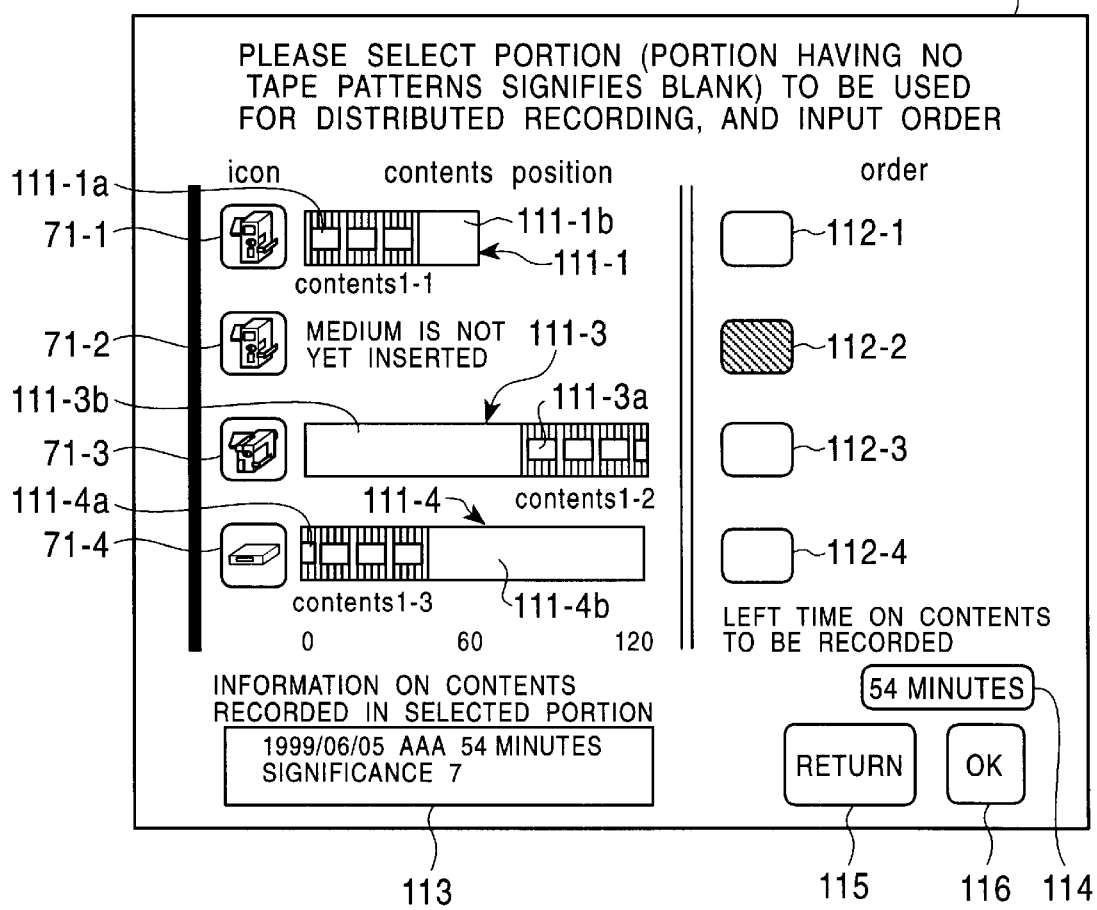
FIG. 15 is an illustration for explaining a GUI to be displayed on an LCD in response to a touch of a "manual" button in FIG. 14.

In the GUI of FIG. 15, icons 71-1 to 71-4 display the external shapes of the DVCRs 4-1 to 4-4, respectively. In addition, the recording states of the video cassette tapes mounted on the DVCRs 4-1, 4-3 and 4-4 are displayed in tape information display areas 111-1, 111-3 and 111-4, respectively.

The tape information display areas 111-1a, 111-3a and 111-4a indicate the states in which the contents have been already recorded, while the tape information areas 111-1b, 111-3b and 111-4b indicate the states in which nothing has been recorded yet. Incidentally, in a case in which a video cassette tape is not yet mounted in the DVCR 4 (in this case, DVCR 4-2), the tape information display area 111 (in this case, a tape information area 111-2 (not shown)), and a message "Medium is not inserted yet" appears instead.

In recording order input areas 112-1 to 112-4, there are inputted the turns of the video cassette tapes, mounted on the DVCRs 4-1 to 4-4, which determines the order of distribution recording. In addition, in a contents information display area 113, there is displayed the information of the contents selected by the user and recorded in the tape information display area 111. Thus, the example of FIG. 15 indicates the selected contents in which the recording date is Aug. 5, 1999, the contents name is AAA, the time taken for recording is 54 minutes and the significance of the contents is at 7.

In a left time display area 114, there is displayed the length of contents inputted to the length input area 92 of the GUI of FIG. 13. When a priority is successively set in any one of the recording order input area 112-1 to 112-4, the free time (recordable time) of the video cassette tape set is subtracted and the subtraction result time is displayed. Therefore, the user can set the distributed recording priority while confirming the time displayed in the left time display area 114.

Figure 16:
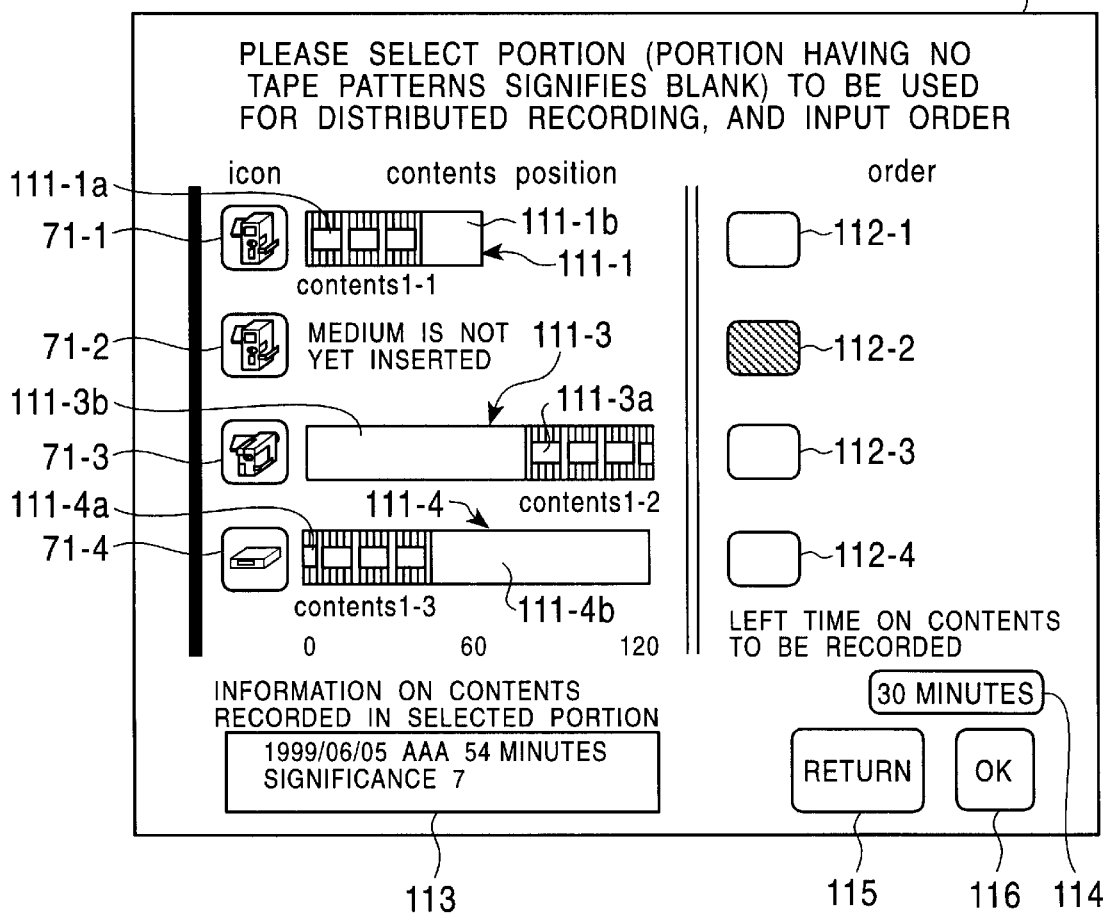
FIG. 16 is an illustration for describing a GUI to be displayed on an LCD.

For example, when the user manipulates a keyboard or the like displayed in the touch panel 28 to set the video cassette tape, mounted on the DVCR 4-1, to the highest priority, that is, when the tape information display area 111-b is put in the first place, numeral 1 is inputted in the recording order input area 112-1. This causes the time after the subtraction of the free time (the time of the tape information display area 111-b) of the video cassette tape mounted on the DVCR 4-1 to be displayed in the left time display area 114 (now, the left time is 30 minutes) as shown in FIG. 16.

Figure 17:
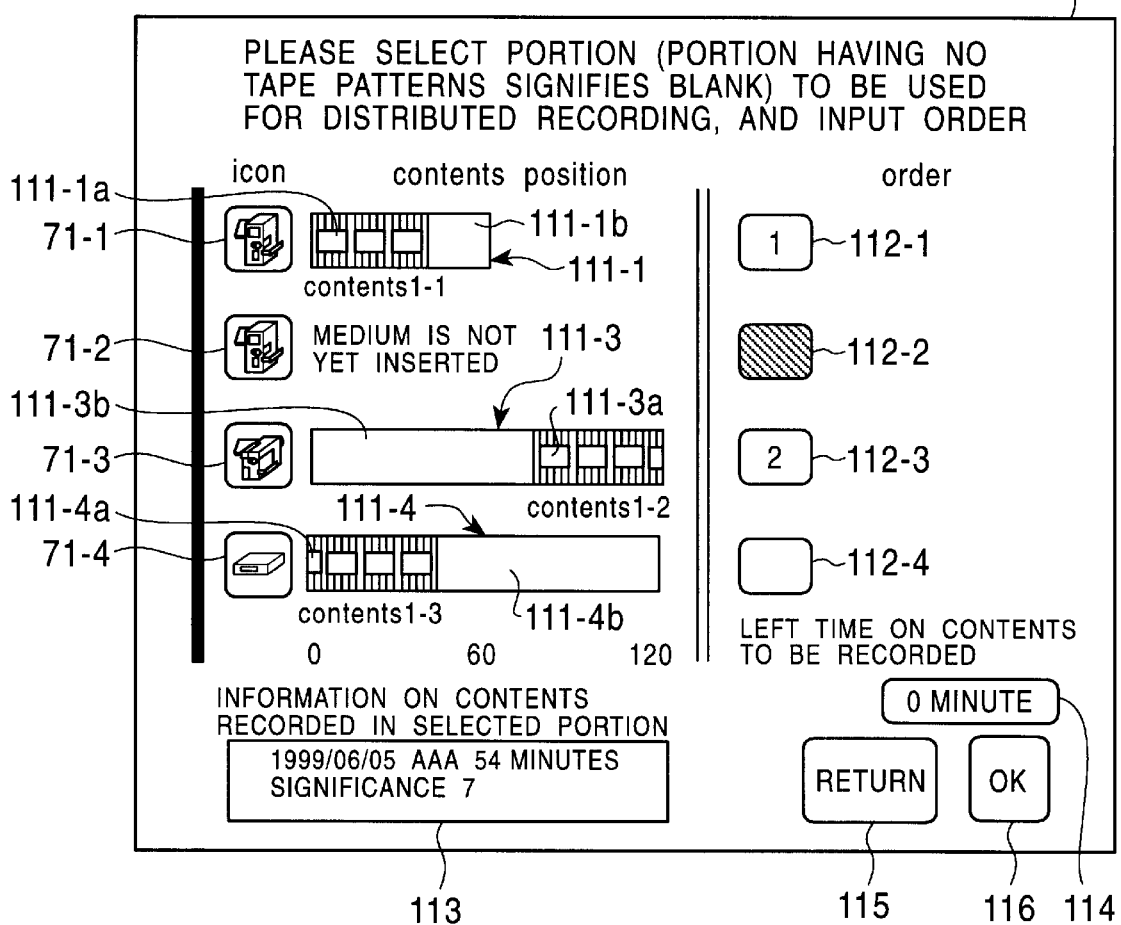
FIG. 17 is an illustration for describing another example of a GUI to be displayed on an LCD.

Furthermore, the user confirms the left time displayed in the left time display area 114 and sets the video cassette tape, mounted on the DVCR 4-3, at the second highest priority, numeral 2 is inputted in the recording order input area 112-3. Accordingly, as shown in FIG. 17, the left time displayed in the left time display area 114 reaches zero minute, and the setting of the distributed recording priority comes to completion.

Incidentally, the recording order input area 112-2 corresponding to the DVCR 4-2 which is in a medium non-inserted condition is screen-displayed (set to a state inhibiting numeral input) in order to prevent the user from inputting in error.

After the setting of the distributed recording priority, the user touches an OK button 116 serving as a completion button. However, if a left time is still displayed in the left time display area 114, the OK button is not yet displayed in order to prevent the user from touching the OK button 116 in error, and the OK button 116 is displayed only when the left time in the left time display area 114 reaches zero minutes. In addition, when a return button 115 is touched, the operation returns to before the start-up of the distributed recording application.

Returning to FIG. 8, in a step S26, the application makes a decision on whether the user manipulates the touch panel 28 to set the order of recording. If a decision is made to no setting of the recording, a step S26 follows to wait until the decision turns to the setting of the recording order. When the user sets the recording order and touches the OK button 116, the operational flow enters into a step S28.

On the other hand, if the decision of the step S24 shows that the mode selected by the user is not the manual mode, that is, when a decision is made that the user manipulates the touch panel 28 and touches the "automatic" button 101, the operational flow enters into a step S27 where the application performs the recording priority automatic setting processing.

For example, among automatic setting methods, there are a method in which video cassette tapes having larger free capacities are selected in order and a method in which video cassette tapes taking shorter time until the tape comes to an end are selected in order. In addition, in the case of the automatic setting, if the free capacity for recording of data is insufficient, the application substitutes for the contents with a low significance set by the user, and at this time, a message indicating whether or not the substitution is conducted is displayed on the LCD 29 so that the user selects in accordance with the message.

In a step S28, the application makes the LCD 29 display a schedule screen set by the user (manually) or automatically. Therefore, for example, a GUI is displayed as shown in FIG. 18.

Figure 18:
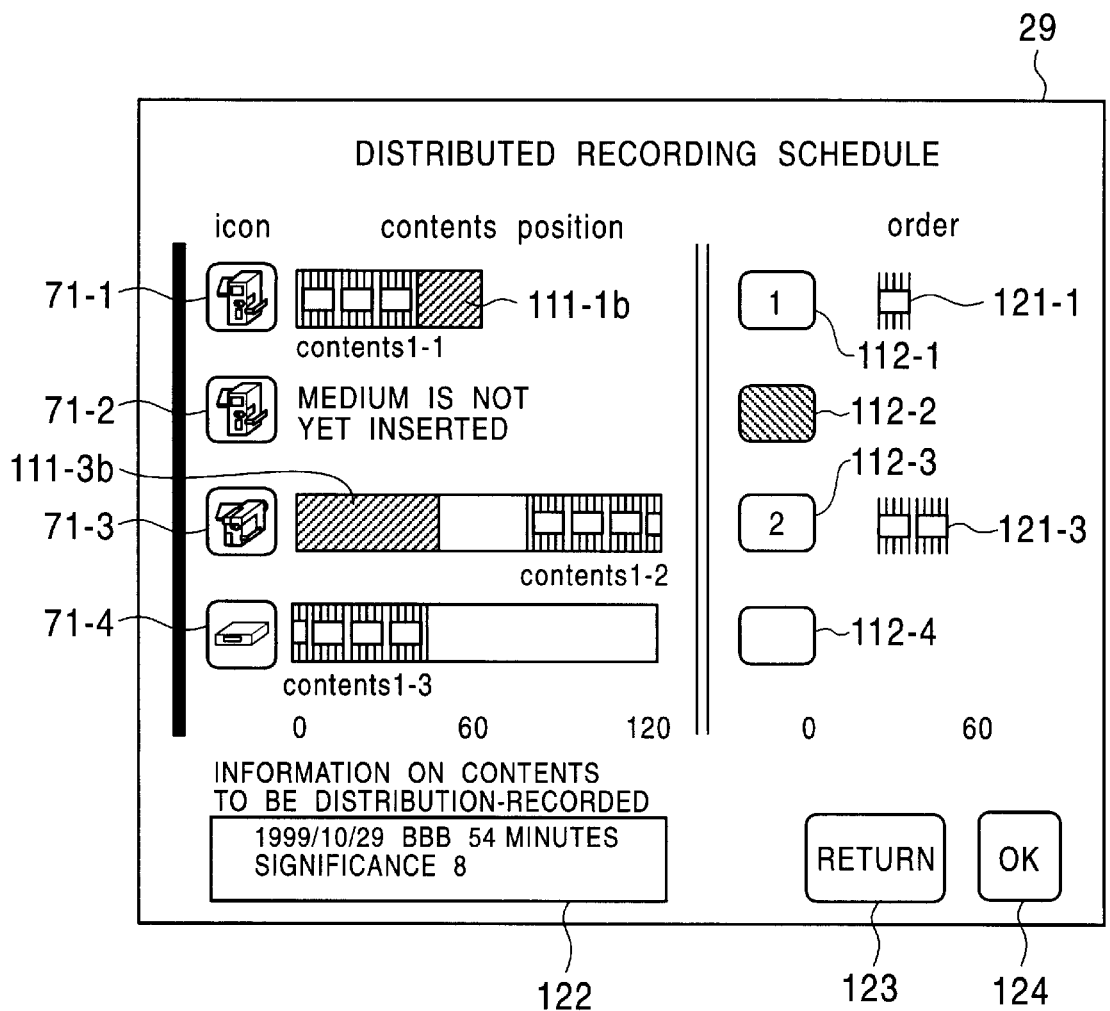
FIG. 18 is an illustration for describing a GUI to be displayed on an LCD in response to a touch of an OK button in FIG. 17.

In the GUI of FIG. 18, the recording information display areas 111-1b and 111-3b are screen-displayed to indicate the setting of the distributed recording priority. In addition, in distributed recording display areas 121-1 and 121-3, there are displayed recording start times of scheduled distributed recording and the lengths of the contents thereof. In a contents information display area 122, there are displayed contents information inputted in the title input area 91 to the start time input area 95 in the GUI of FIG. 13. Accordingly, in the case of the example of FIG. 18, the contents name is BBB, the recording time is 54 minutes, the significance is at 8 and the date of recording of the contents is Oct. 29, 1999.

When the user touches an OK button 124, the confirmation of the distributed recording schedule is communicated to the IRD 2. In addition, when changing this distributed recording schedule, the user touches a return button 123, thereby returning to the GUI screen of FIG. 15.

In a step S29, the application makes a decision on whether the user manipulates the touch panel 28 to confirm the schedule, that is, whether or not the user touches the OK button 121 or the return button 123 in the GUI screen of FIG. 18. If a decision is made that the schedule is not confirmed yet, a step S29 follows to wait until the decision is made that the user has confirmed the schedule.

Furthermore, on the confirmation of the schedule in a step S29, in a step S30, the application registers the schedule in the resource manager, thereafter coming to completion. Thus, the user can reserve the next distributed recording.

Figure 19:
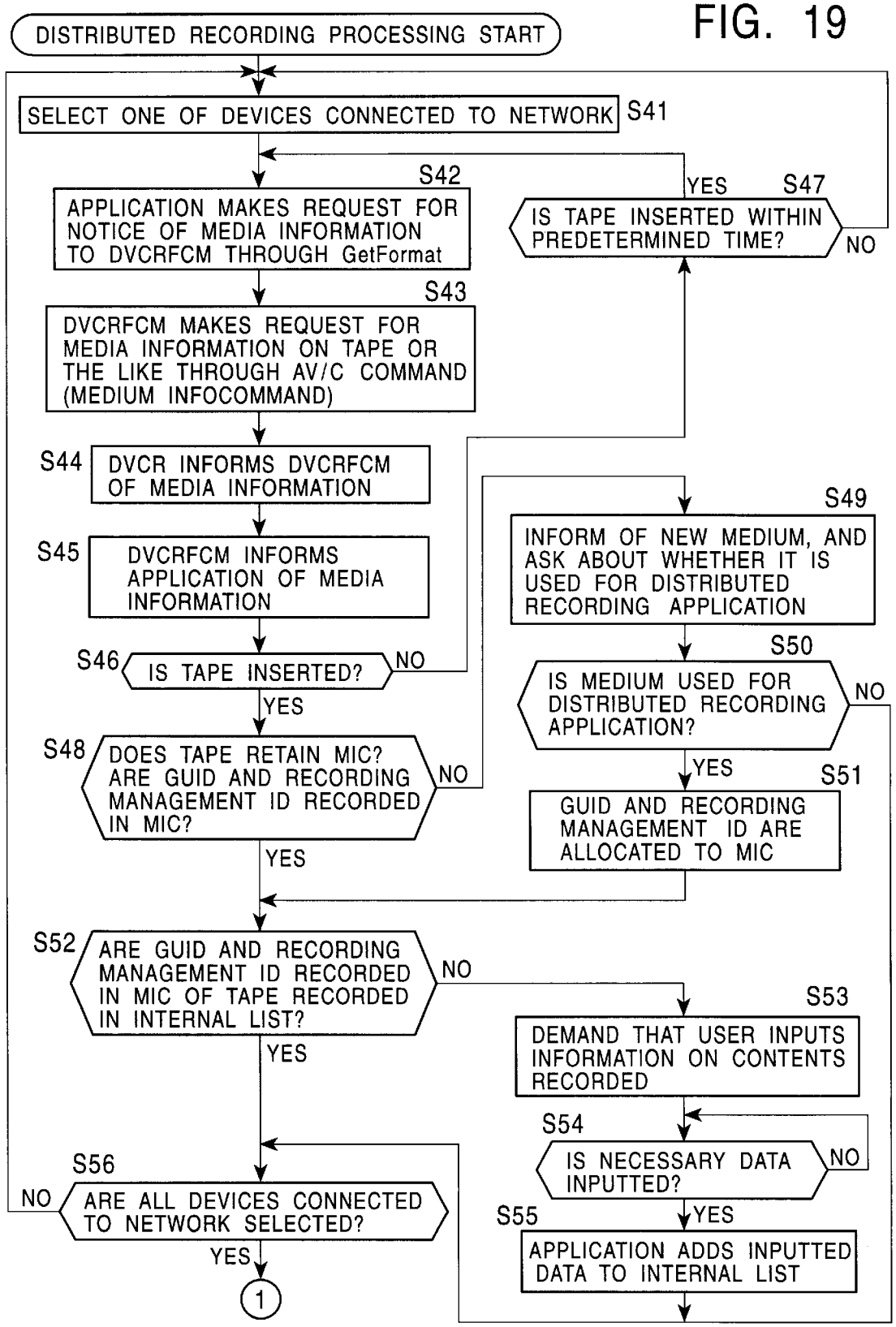
FIG. 19 is a flow chart useful for describing another example of the distributed recording processing.
Figure 20:
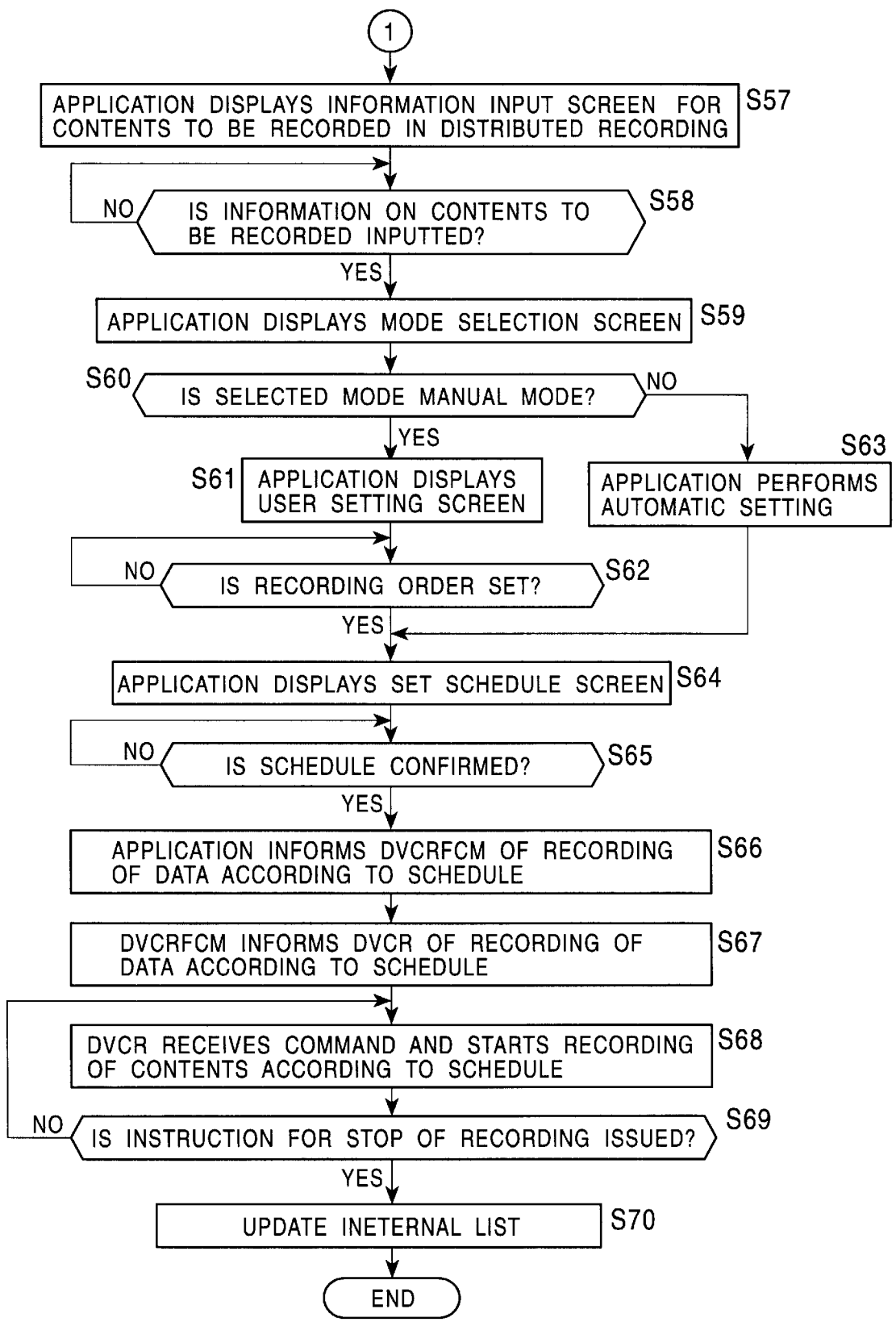
FIG. 20 is a flow chart subsequent to the flow chart of FIG. 19.

Secondly, referring to the flow charts of FIGS. 19 and 20, a description will be given hereinbelow of another distribution recording processing to be conducted by the IRD 2. This processing will be conducted in connection with the mounting/dismounting of tapes or immediate distribution recording, and hence it does not include the decision on the distributed recording out-of object devices and the processing steps related thereto, while steps S41 to S65 of this processing are similar to those in the above-described steps S1 to S29 (except the steps S7, S8, S10 and S15), and the description thereof will be omitted for brevity.

Figure 21:
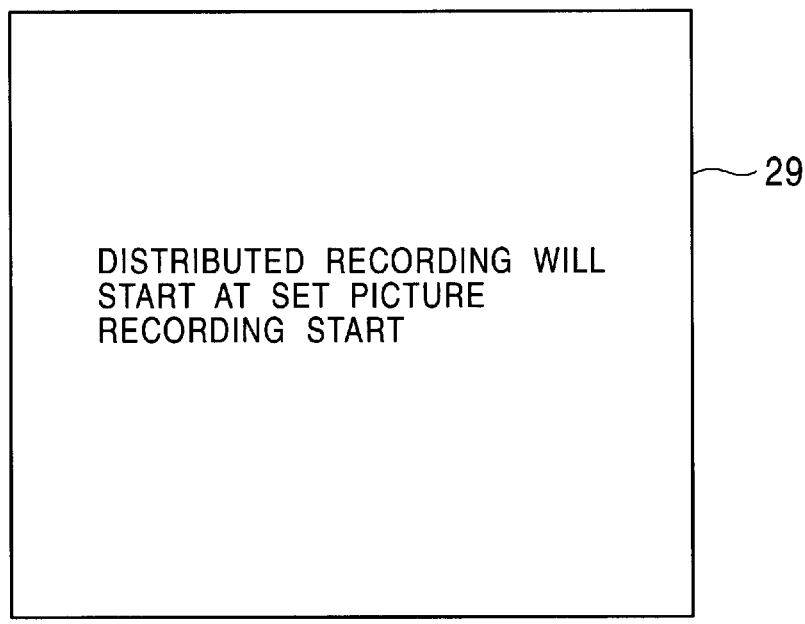
FIG. 21 is an illustration for describing a GUI to be displayed on an LCD in response to a touch of an OK button in FIG. 18.
Figure 22:
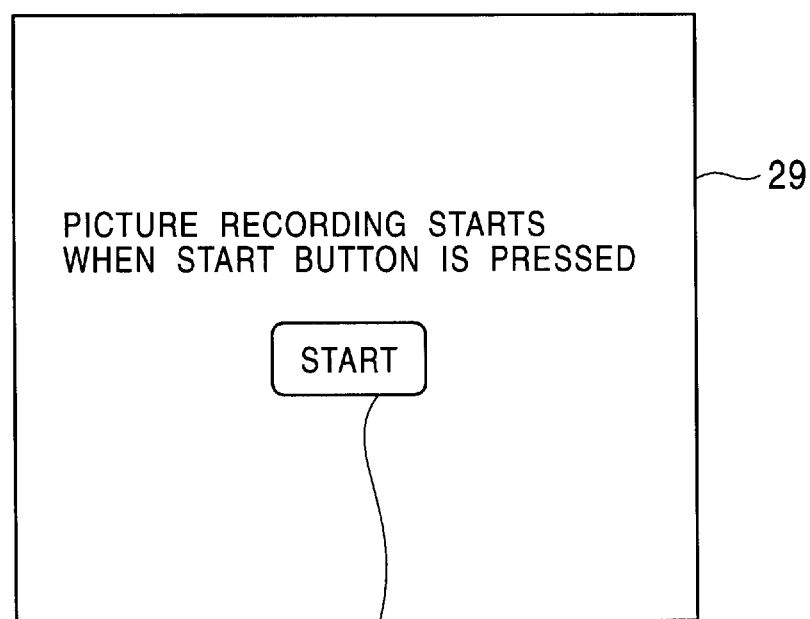
FIG. 22 is an illustration for describing a GUI to be displayed on an LCD.

In this example, after a step S65, that is, when a schedule is confirmed in the step S65, an application makes the LCD 20 display a message on the contents of the setting of recording priority. Accordingly, for example, a GUI on a message "Distributed recording will start at a picture recording time set" is displayed as shown in FIG. 21. In addition, after the display of the GUI shown in FIG. 21, a message for inducing the recording start is displayed. Thus, for example, a GUI on a message "Picture recording will start when a start button is pressed." appears as shown in FIGS. 22. The user touches a start button 131 to issue a command for the recording start.

In a step S66, the application informs the DVCRFCM 1 to DVCRFCM 4 of the recording of the contents according to the schedule in accordance with the command from the user. In a step S67, the DVCRFCM 1 to DVCRFCM 4 inform the DVCRs 4-1 to 4-4 of the recording of the data (contents) according to the schedule through the IEEE1394 serial buses 1, respectively. In addition, upon receipt of the commands from the DVCRFCM 1 to DVCRFCM 4, in a step S68, the DVCRs 4-1 to 4-4 (cup 53) control the recording/reproduction processing section 56 to start the recording of the contents according to the schedule.

Furthermore, in a step S69, the application makes a decision on whether the user manipulates the touch panel 28 to give a command for stopping or whether or not that contents recording reaches completion. If a negative decision is made to both, the operational flow returns to the step S68 to conduct the above-described processing repeatedly. If the answer of the step S69 shows an affirmative decision with respect to any one of them, the operational flow enters into a step S70 where the application updates the information recorded in the internal list of the hard disk 30 on the basis of the contents recorded, then terminating the processing.

In the above description, although the IRD 2 makes a request for the successive notice of the media information with respect to the DVCRs 41- to 4-4 connected to the network, it is also possible to request a notice of the media information at the same time.

In addition, although the above-described example relates to the distributed recording, for example, in a case in which the contents to be recorded are recordable on one video cassette tape, there is no need to perform the distributed recording.

Still additionally, in the case in which an overlap time is set to reproduce the contents at the switching of tapes for the distribution recording, the continuity is still maintainable. Incidentally, the user can arbitrarily set this overlap time.

Figure 23:
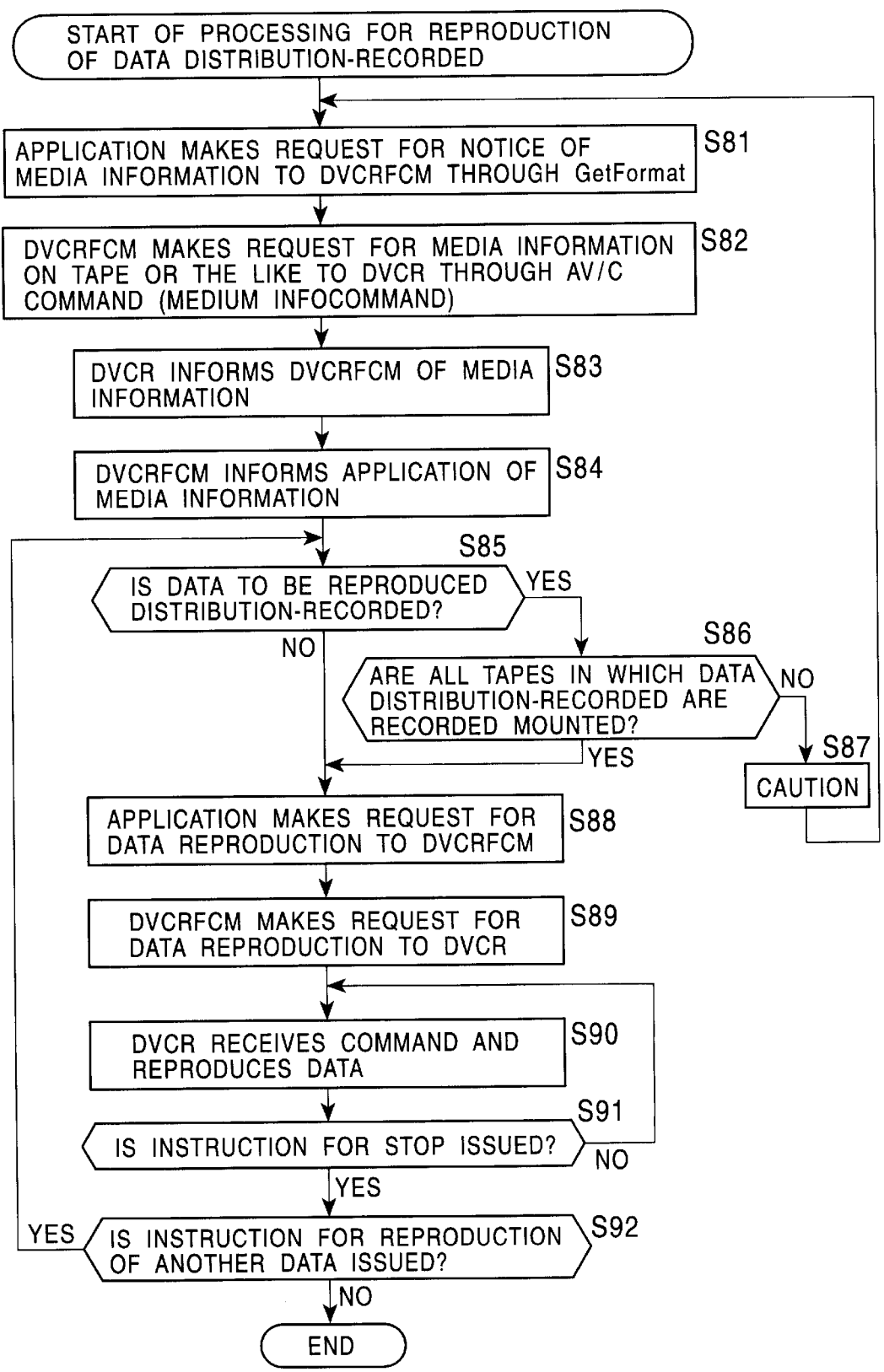
FIG. 23 is a flow chart useful for describing reproduction processing of data recorded in the form of distribution.

Moreover, referring to the flow chart of FIG. 23, a description will be given hereinbelow of reproduction processing of data (the contents scheduled for the distribution recording in the GUI of FIG. 15) distribution-recorded, implemented by the IRD 2. This processing will start in response to a data reproduction command inputted by the user.

In a step S81, an application outputs a command GetFormat for requesting a notice of media information with respect to the DVCRFCM 1 to DVCRFCM 4 on the basis of a command from the user (the user touches a contents name to be reproduced in the tape information display area 111 of the GUI of FIG. 15). In a step S82, the DVCRFCM 1 to DVCRFCM 4 output AV/C commands (MEDIUM INFO) for notice of the media information to the DVCRs 4-1 to 4-4.

In a step S83, when receiving such notice from the DVCRFCM 1 to the DVCRFCM 4, the DVCRs 4-1 to 4-4 inform the DVCRFCM 1 to the DVCRFCM 4 of their own media information. In a step S84, when receiving responses (media information) from the DVCRs 4-1 to 4-4, the DVCRFCM 1 to the DVCRFCM 4 communicate the media information to the application.

In a step S85, the application reads out a distributed recording flag on data (contents) to be reproduced from the internal list of the hard disk 30 to decide whether or not it is distributed recording. If so, the operational flow enters into a step S86 where the application makes a decision, on the basis of the acquired media information, as to whether or not all the video cassette tapes in which the distribution-recorded data exist are mounted, that is, in this case, whether the video cassette tapes are mounted on the DVCRs 4-1 and 4-3. In the case of the negative decision, the operational flow enters into a step S87.

In the step S87, the application displays, on the LCD 29, for example, a message (caution) "A medium needed for reproduction is not inserted.". Following this, the operational flow returns to the step S81.

If the step S86 shows the affirmative decision, or if the answer of the step S85 indicates that the data to be reproduced is not distribution-recorded data, a step S88 follows where the application issues a request for data reproduction to the DVCRFCM 1 to the DVCRFCM 4 (in this case, DVCRFCM 1 and DVCRFCM 3).

In a step S89, the DVCRFCM 1 and DVCRFCM 3 make a request for data reproduction to the DVCRs 4-1 and 4-3, respectively. In a step S90, upon receipt of the commands from DVCRFCM 1 and DVCRFCM 3, the DVCRs 4-1 and 4-3 control the recording/reproduction control section 56 for reproducing the data on the basis of the internal list.

At this time, the first portion of the distribution-recorded data is recorded on the video cassette tape mounted on the DVCR 4-1, and the DVCR 4-1 first reproduces the contents distribution-recorded in the tape. Furthermore, at the switching of the tape, since an overlap time is set, the DVCR 4-3, which takes charge of the reproduction of the subsequent portion, starts earlier the reproduction of the contents distribution-recorded in the tape, which secures the reproduction of the distribution-recorded contents while maintaining the continuity.

In a step S91, the application makes a decision on whether or not the user manipulates the touch panel 28 for giving an instruction for stopping or whether or not the tape reproduction comes to an end. If a "NO" decision is made to both, the operational flow returns to a step S90 for conducting the above-described processing repeatedly. If the decision of the step S91 shows that the data reproduction comes to an end, a step S92 follows where the application makes a decision on whether or not the user gives an instruction for reproduction of another data. If there is the instruction for the reproduction of another data, the operational flow returns to the step S85 to conduct the above-described processing and the subsequent processing repeatedly. On the other hand, if there is no instruction for the another data reproduction, the processing comes to an end.

Incidentally, in the above description, although, in the case of no insertion of the distributed recording video cassette tape, a caution is issued prior to the start of the data reproduction, it is also acceptable to present a caution at the time that the reproduction has become impossible after the start of the reproduction.

As described above, by storing the media information of the video cassette tape inserted into the controlled side (LAV) DVCR 4 in the internal list of the controlling side (IAV or FAV) IRD 2, it is possible to accomplish the recording/reproduction of data efficiently without waste.

In addition, although the above description relates to the case in which data is recorded on video cassette tapes in the form of distribution, the present invention is also applicable to a case in which tapes and hard disks are combined for the distribution recording.

Still additionally, in the case of the distribution recording described above, the correction or alteration of recording data becomes feasible in the real time and pseudo-random-access becomes possible.

A software for conducting the above-described series of processing is built in a dedicated hardware of a computer in the form of a corresponding program, or is installed through a recording medium in, for example, a general-purpose personal computer which can perform various functions in a state where various kinds of programs are installed.

In addition to the program retaining hard disk 30 to be presented to a user in a state incorporated into the IRD 2 in advance as shown in FIG. 3, the above-mentioned recording medium comprises, apart from the IRD 2, package media including a program-recorded magnetic disc 41 (including a floppy disc), optical disc 42 (CD-ROM (Compact Disc-Read Only Memory), DVD (Digital Versatile Disc), magneto-optical disc 43 (including an MD) or semiconductor memory 44 to be distributed for presenting programs to users.

Moreover, in this specification, the steps constituting the program to be recorded in the recording medium includes not only the processing to be conducted in time series according to the written sequence but also the processing which is not always conducted in the time series but is conducted in parallel or individually.

Still moreover, in this specification, a system signifies the entire apparatus made up of a plurality of devices.

As described above, with the information processing system, information processing method and program in a recording medium according to the present invention, the recording order is set on the basis of the free condition of a recording medium to record data in accordance with the set recording order; therefore, it is possible to perform the distribution recording on a plurality of recording media efficiently and effectively.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. An information processing system for storing data to a plurality of recording media in a distributed manner comprising:

first detecting means for detecting identification information corresponding to each of a plurality of recording media;

second detecting means for detecting a free condition of each of said plurality of recording media, wherein said free condition includes a number of free blocks of each recording media and a total free capacity of each recording media;

storage control means for storing information in an internal list corresponding to each of said plurality of recording media, said stored information indicating a storage condition of each block of each of said recording media, wherein, if said second detecting means determines that a block of a particular recording medium is in a free condition, a time code and length of said free block is recorded and a number of free blocks and total free capacity of said particular recording media is recorded in said internal list, and wherein if said second detecting means determines that a block of a particular recording medium is not in a free condition, a previous-contents recording medium ID and associated overlap time, and a next-contents recording medium ID and associated overlap time are recorded in said internal list;

setting means for setting a recording of said plurality of recording media, on the basis of said free conditions of said each of said plurality of recording media; and recording control means for recording data on one or more of said plurality of recording media in accordance with said recording order set by said setting means.

2. An information processing system according to claim 1, wherein said setting means sets the recording order in either a first mode in which the setting is made by a user or a second mode in which the setting is made automatically.

3. An information processing system according to claim 1, further comprising display control means for controlling display of the recording order set by said setting means.

4. An information processing system according to claim 1, further comprising reproducing means for continuously reproducing data recorded on said one or more recording media in the form of distribution.

5. An information processing system according to claim 1, further comprising designating means for designating a priority to each of said plurality of recording media.

6. An information processing system according to claim 1, wherein said detecting means detects said identification information through a network.

7. An information processing method for storing data to a plurality of recording media in a distributed manner comprising the steps of:

detecting identification information corresponding to each of a plurality recording media;

detecting a free condition of each of said plurality of recording media, wherein said free condition includes a number of free blocks of each recording media and a total free capacity of each recording media;

storing information in an internal list corresponding to each of said plurality of recording media, said stored information indicating a storage condition of each block of each of said recording media, wherein, if it is determined that a block of a particular recording medium is in a free condition, a time code and length of said free block is recorded and a number of free blocks and total free capacity of said particular recording media is recorded in said internal list, and wherein if it is determined that a block of a particular recording medium is not in a free condition, a previous-contents recording medium ID and associated overlap time, and a next-contents recording medium ID and associated overlap time are recorded in said internal list;

setting a recording order of said plurality of recording media, on the basis of said free conditions of said each of said plurality of recording media; and recording data on one or more of said plurality of recording media in accordance with said recording order set in said setting step.

8. A recording medium retaining a computer-readable program, said program comprising the steps of:

detecting identification information corresponding to each of a plurality recording media;

detecting a free condition of each of said plurality of recording media, said free condition including a number of free blocks of each recording media and total free capacity each recording media;

storing information in an internal list corresponding to each of said plurality of recording media, said stored information indicating a storage condition of each block of each of said recording media, wherein, if it is determined that a block of a particular recording medium is in a free condition, a time code and length of said free block is recorded and a number of free blocks and total free capacity of said particular recording media is recorded in said internal list, and wherein if it is determined that a block of a particular recording medium is not in a free condition, a previous-contents recording medium ID and associated overlap time, and a next-contents recording medium ID and associated overlap time are recorded in said internal list;

setting a recording order of said plurality of recording media, on the basis of said free conditions of said each of said plurality of recording media; and recording data on one or more of said plurality of recording media in accordance with said recording order set in said setting step.

9. An information processing method according to claim 7, wherein the recording order is set in either a first mode in which the setting is made by a user or a second mode in which the setting is made automatically.

10. An information processing method according to claim 7, further comprising the step of controlling display of the recording order set by said setting means.

11. An information processing method according to claim 7, further comprising the step of continuously reproducing data recorded on said plurality of recording media in the form of distribution.

12. An information processing method according to claim 7, further comprising the step of designating a priority to each of said plurality of recording media.

13. An information processing method according to claim 7, wherein said identification information is detected through a network.

* * * * *